US011225495B2

(12) United States Patent
Do et al.

(10) Patent No.: US 11,225,495 B2
(45) Date of Patent: Jan. 18, 2022

(54) TRANSITION METAL COMPOUND AND METHOD FOR PREPARING THE SAME

(71) Applicant: LG Chem, Ltd., Seoul (KR)

(72) Inventors: Young Shil Do, Daejeon (KR); Jin Sam Gong, Daejeon (KR); Eun Jung Lee, Daejeon (KR); Choong Hoon Lee, Daejeon (KR); Seung Hwan Jung, Daejeon (KR); Yoon Hee Cho, Daejeon (KR); Hyo Jung Han, Daejeon (KR)

(73) Assignee: LG Chem, Ltd.

( * ) Notice: Subject to any disclaimer, the term of this patent is extended or adjusted under 35 U.S.C. 154(b) by 111 days.

(21) Appl. No.: 16/614,217

(22) PCT Filed: Jul. 27, 2018

(86) PCT No.: PCT/KR2018/008561
§ 371 (c)(1),
(2) Date: Nov. 15, 2019

(87) PCT Pub. No.: WO2019/022569
PCT Pub. Date: Jan. 31, 2019

(65) Prior Publication Data
US 2021/0032274 A1 Feb. 4, 2021

(30) Foreign Application Priority Data

Jul. 27, 2017 (KR) ............... 10-2017-0095360
Jul. 27, 2017 (KR) ............... 10-2017-0095361
Jul. 26, 2018 (KR) ............... 10-2018-0087437

(51) Int. Cl.
| C07F 7/00 | (2006.01) |
| C08F 4/64 | (2006.01) |
| C08F 4/76 | (2006.01) |
| C07F 7/28 | (2006.01) |
| C08F 10/02 | (2006.01) |

(52) U.S. Cl.
CPC ............... *C07F 7/28* (2013.01); *C08F 10/02* (2013.01); *C08F 4/64* (2013.01); *C08F 4/76* (2013.01)

(58) Field of Classification Search
CPC .... C08F 4/64; C08F 2420/02; C08F 2420/05; C08F 2420/06; C08F 2420/07; C07F 7/00
See application file for complete search history.

(56) References Cited

U.S. PATENT DOCUMENTS

| 5,064,802 | A | 11/1991 | Stevens et al. | |
| 6,693,155 | B1 | 2/2004 | Meverden et al. | |
| 6,730,754 | B2 * | 5/2004 | Resconi | C07F 7/0812 526/129 |
| 6,818,713 | B1 * | 11/2004 | Wang | C08F 210/16 502/103 |
| 6,861,485 | B2 * | 3/2005 | Wang | C08F 210/16 526/119 |
| 6,995,220 | B2 * | 2/2006 | Wang | C08F 210/16 526/128 |
| 6,998,451 | B2 * | 2/2006 | Nagy | C08F 210/16 526/135 |
| 7,253,292 | B2 * | 8/2007 | Nifant'ev | C07D 209/94 544/247 |
| 2002/0147286 | A1 | 10/2002 | Resconi et al. | |
| 2004/0023791 | A1 * | 2/2004 | Wang | C08F 210/16 502/102 |
| 2004/0236115 | A1 | 11/2004 | Nifantev et al. | |
| 2005/0228156 | A1 * | 10/2005 | Holland | B32B 27/32 526/348.1 |
| 2005/0245700 | A1 | 11/2005 | Wang et al. | |
| 2008/0287620 | A1 | 11/2008 | Ravishankar | |
| 2008/0287692 | A1 | 11/2008 | Nifant'ev et al. | |
| 2016/0326281 | A1 | 11/2016 | Kim et al. | |
| 2017/0145721 | A1 | 5/2017 | Kim et al. | |
| 2017/0349684 | A1 | 12/2017 | Cho et al. | |
| 2017/0362350 | A1 | 12/2017 | Canich et al. | |

FOREIGN PATENT DOCUMENTS

| CN | 1372571 A | 10/2002 |
| CN | 1934148 A | 3/2007 |
| CN | 106488923 A | 3/2017 |
| JP | 2004530689 A | 10/2004 |
| KR | 20010112350 A | 12/2001 |
| KR | 20050115888 A | 12/2005 |

(Continued)

OTHER PUBLICATIONS

Kashulin et al., Efficient Method for the Synthesis of Hetarenoindanones Based on 3-Arylhetarenes and Their Conversion into Hetarenoindenes, Journal of Organic Chemistry, Published on Web Jul. 2004, p. 5476-5479, vol. 69, American Chemical Society.

International Search Report for Application No. PCT/KR2018/008561, dated Nov. 2, 2018, pp. 1-2.

Wu et al., Ortho Lithiation of Tetrahydroquinoline Derivatives and Its Use for the Facile Construction of Polymerization Catalysts, Organometallics, Dec. 2007, pp. 6685-6687, vol. 26, No. 27, American Chemical Society.

Search Report for Chinese Application No. 201880029331.4 dated Nov. 24, 2021. 2 pgs.

*Primary Examiner* — Rip A Lee
(74) *Attorney, Agent, or Firm* — Lerner, David, Littenberg, Krumholz & Mentlik, LLP

(57) ABSTRACT

A transition metal compound represented by Chemical Formula 1 and a method for preparing the same, catalyst compositions including the same, and olefin-based polymers prepared from the same are disclosed herein. The transition metal catalyst has excellent structural stability together with excellent catalytic activity and can exhibit excellent copolymerizability even at a high temperature. In an embodiment, an olefin-based polymer prepared using a catalyst composition including the transition metal compound has a density of 0.91 g/cc or less.

17 Claims, No Drawings

(56) References Cited

FOREIGN PATENT DOCUMENTS

| | | | |
|---|---|---|---|
| KR | 20160054849 A | 5/2016 |
| KR | 20160057291 A | 5/2016 |
| KR | 20170004398 A | 1/2017 |
| KR | 20180054060 A | 5/2018 |
| WO | 02092564 A2 | 11/2002 |
| WO | 2016114914 A1 | 7/2016 |

* cited by examiner

TRANSITION METAL COMPOUND AND METHOD FOR PREPARING THE SAME

CROSS-REFERENCE TO RELATED APPLICATIONS

The present application is a national phase entry under 35 U.S.C. § 371 of International Application No. PCT/KR2018/008561, filed on Jul. 27, 2018, which claims priority from Korean Patent Application No. 10-2017-0095360, filed on Jul. 27, 2017, Korean Patent Application No. 10-2017-0095361, filed on Jul. 27, 2017, and Korean Patent Application No. 10-2018-0087437, filed on Jul. 26, 2018, the disclosures of which are incorporated herein by reference.

TECHNICAL FIELD

The present invention relates to a novel transition metal compound, a method for preparing the same, and a catalyst composition including the transition metal compound.

BACKGROUND ART

In the existing commercial preparation process of polyolefins, Ziegler-Natta catalysts such as titanium and vanadium compounds have been widely used. However, although the Ziegler-Natta catalyst has high activity, it is a multi-active-site catalyst, and thus has a limit in securing desired physical properties because the molecular weight distribution of the produced polymer is wide and the compositional distribution of comonomers is not uniform.

Thus, recently, metallocene catalysts wherein a transition metal such as titanium, zirconium, hafnium, and the like, and a ligand including a cyclopentadiene functional group are bonded were developed and are being widely used. The metallocene compound is generally activated with aluminoxane, borane, borate, or other activators before use. For example, a metallocene compound having a ligand including a cyclopentadienyl group and two sigma chloride ligands uses aluminoxane as an activator. When the chloride group of such a metallocene compound is substituted with another ligand (e.g., a benzyl or trimethylsilylmethyl group (—$CH_2SiMe_3$)), an example showing effects such as an increase in catalytic activity has been reported.

Dow Chemical Company disclosed [$Me_2Si(Me_4C_5)$NtBu]$TiCl_2$ (Constrained-Geometry Catalyst, hereinafter 'CGC') in the early 1990's (U.S. Pat. No. 5,064,802), and the superior aspects of the GCC in copolymerization reaction between ethylene and alpha-olefin compared to metallocene catalysts that have been known in the art can largely be summarized by two points as follows. (1) CGC produces a high molecular weight polymer while exhibiting high activity even at high polymerization temperatures, and (2) the copolymerizability of alpha-olefin having large steric hindrance such as 1-hexene and 1-octene is also excellent. In addition, as various characteristics in the polymerization reaction of CGC have been gradually known, efforts have been made to synthesize derivatives of CGC in the academic world and the industrial world for use as a polymerization catalyst.

As one of the approaches, synthesis of a metal compound to which various bridges and nitrogen substituents are introduced instead of silicone bridges and polymerization using the same have been attempted. Representative metal compounds known up to now include phosphorus, ethylene or propylene, methylidene, and methylene bridges respectively introduced thereto instead of a silicone bridge of a CGC structure, but they did not show excellent results in the aspects of polymerization activity or copolymerization performance in comparison to CGC when they were applied to polymerization of ethylene or to copolymerization of ethylene and alpha olefins.

As another approach, many compounds including oxido ligands instead of amido ligands of the CGC have been synthesized, and some polymerization attempts using the same have been tried.

However, very few catalysts have been being applied in practice in commercial factories among the above attempts, and there is still a demand for a catalyst exhibiting improved polymerization performance.

DETAILS OF THE INVENTION

Objects of the Invention

One object of the present invention is to provide a novel transition metal compound which exhibits excellent copolymerizability at high temperatures, and thus is useful for the preparation of an olefin-based polymer, especially a high molecular weight and low density olefin-based polymer.

Another object of the present invention is to provide a method for preparing a transition metal compound containing a novel ligand compound having indeno-fused benzofuran or indeno-fused benzothiophene structures having certain substituents.

Still another object of the present invention is to provide a catalyst composition including the above-mentioned transition metal compound.

A further object of the present invention is to provide an olefin-based polymer prepared using the catalyst composition including the transition metal compound.

Means for Achieving the Object

According to one embodiment of the present invention, a transition metal compound represented by the following Chemical Formula 1 is provided.

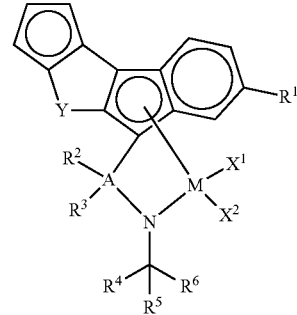

[Chemical Formula 1]

In Chemical Formula 1,
A is carbon (C), silicon (Si), or germanium (Ge);
Y is oxygen (O) or sulfur (S);
M is a Group 4 transition metal;
$X^1$ and $X^2$ are the same as or different from each other and are each independently a halogen, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;

$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group:

$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring; and $R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl.

According to another embodiment of the invention, a method for preparing a transition metal compound represented by the following Chemical Formula 1 is provided, including the steps of: reacting a ligand compound represented by the following Chemical Formula 2 with an organolithium-based compound; and then reacting the resultant reaction product with a compound represented by the following Chemical Formula 3, and a Grignard compound or an organolithium-based compound.

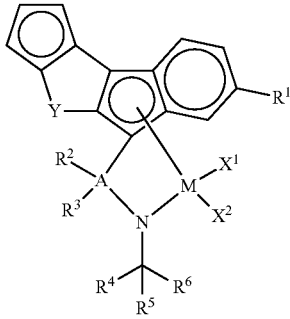
[Chemical Formula 1]

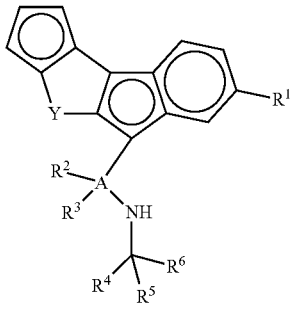
[Chemical Formula 2]

$M(X^1X^2)_2$
[Chemical Formula 3]

In Chemical Formulae 1, 2, and 3,

A is carbon (C), silicon (Si) or germanium (Ge);

Y is oxygen (O) or sulfur (S);

M is a Group 4 transition metal;

$X^1$ and $X^2$ are the same as or different from each other and are each independently a halogen, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;

$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group;

$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring; and $R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl.

According to another embodiment of the present invention, a catalyst composition including the transition metal compound of Chemical Formula 1 is provided.

According to another embodiment of the present invention, an olefin-based polymer that is prepared using the aforementioned catalyst composition and has a density of 0.91 g/cc or less is provided.

Effects of the Invention

The transition metal compound according to the present invention has excellent structural stability together with excellent polymerization reactivity and can exhibit excellent copolymerizability at a high temperature. As a result, the transition metal compound is useful for the preparation of olefin-based polymers, especially high molecular weight and low density polyethylene.

In addition, the transition metal compound is particularly useful for the preparation of copolymers of ethylene and alpha olefins since approaches of monomers having large steric hindrance are more structurally facilitated.

DETAILED DESCRIPTION OF THE EMBODIMENTS

Hereinafter, a novel transition metal compound according to specific embodiments of the present invention, a method for preparing the same, a catalyst composition including the same, and an olefin-based polymer prepared using the same will be described.

Prior to the description, the terminology used herein is for the purpose of describing particular embodiments only and is not intended to limit the scope of the invention.

Further, the singular forms "a", "an", and "the" are intended to include plural referents, unless the context clearly indicates otherwise.

In addition, the meaning of the terms "comprise" and "include" as used herein is intended to specify the presence of stated features, ranges, integers, steps, operations, elements, and/or components, but does not preclude the presence or addition of other features, ranges, integers, steps, operations, elements, and/or components.

The terms "first", "second", etc. may be used herein to describe various components, and these terms are used only for distinguishing one element from others.

Further, terms used "herein" are used only to describe particular embodiments, and are not intended to be limiting of the invention.

As used herein, singular expressions are intended to include plural expressions as well, unless the context clearly indicates otherwise. It should be understood that the terms "comprise", "include", "have", etc. are used herein to specify the presence of stated features, numbers, steps, components, or combinations thereof, but do not preclude the presence or addition of one or more other features, numbers, steps, components, or combinations thereof.

Since the embodiments of the present invention are susceptible to various modifications and alternative forms, specific embodiments thereof will be illustrated and described in detail below.

It should be understood, however, that the present invention is not limited to the particular embodiments disclosed, but on the contrary, the invention is to cover all modifications, equivalents, and alternatives falling within the spirit and scope of the invention.

Hereinafter, the present invention will be described in more detail.

Words or terms used in the specification and the appended claims are not to be interpreted limitedly to common or dictionary meanings, and shall be interpreted as meanings and concepts corresponding to technological ideas of the present invention based on a principle in which inventors may suitably define the concepts of terms in order to describe their own invention in the best possible way.

Unless otherwise defined herein, an alkyl group refers to a straight-chain and branched aliphatic saturated hydrocarbon group having 1 to 20 carbon atoms. Specifically, the alkyl group includes a straight-chain or branched alkyl group having 1 to carbon atoms, and more specifically 1 to 8 carbon atoms. Specific examples of the alkyl group may include a methyl group, an ethyl group, an n-propyl group, an isopropyl group, an n-butyl group, an isobutyl group, a sec-butyl group, a t-butyl group, a pentyl group, an iso-amyl group, a hexyl group, a heptyl group, an octyl group, or the like.

Further, unless otherwise defined herein, an alkoxy group refers to a straight-chain or branched alkyl group (—OR) having 1 to 20 carbon atoms which is bonded via an oxygen. Specifically, the alkyl group includes an alkyl group having 1 to 20 carbon atoms, and more specifically 1 to 6 carbon atoms. Specific examples of the alkoxy group include a methoxy group, an ethoxy group, a propoxy group, a butoxy group, a t-butoxy group, or the like.

Further, unless otherwise defined herein, the alkoxyalkyl group refers to a functional group in which a hydrogen atom on a carbon of the straight-chain or branched alkyl group is substituted by the alkoxy group as defined above. Specifically, an alkoxyalkyl group preferably includes an alkoxyalkyl group having 2 to 20 carbon atoms, and more specifically 2 to 12 carbon atoms. Specific examples of the alkoxyalkyl group may include a methoxymethyl group, a tert-butoxymethyl group, a tert-butoxyhexyl group, a 1-ethoxyethyl group, a 1-methyl-1-methoxyethyl group, or the like.

Further, unless otherwise defined herein, an alkenyl group refers to a straight-chain and branched aliphatic unsaturated hydrocarbon group having 2 to 20 carbon atoms and containing a carbon-carbon double bond. Specifically, the alkenyl group includes an alkenyl group having 2 to 6 carbon atoms. Specific examples of the alkenyl group may include an ethenyl group, a propenyl group, a butenyl group, or the like.

Further, unless otherwise defined herein, a cycloalkyl group refers to a cyclic saturated hydrocarbon group having 3 to 20 carbon atoms. Specifically, the cycloalkyl group includes a cycloalkyl group having 3 to 6 carbon atoms. Specific examples of the cycloalkyl group may include a cyclopropyl group, a cyclobutyl group, a cyclohexyl group, or the like.

Further, unless otherwise defined herein, an aryl group refers to a carbocyclic aromatic radical having from 6 to 20 carbon atoms and including one or more rings, wherein such rings may be attached together in a pendant manner or may be fused.

Specifically, the aryl group includes an aryl group having 6 to 20 carbon atoms, and more specifically 6 to 12 carbon atoms.

Specific examples of the aryl group may include a phenyl group, a naphthyl group, a biphenyl group, or the like.

Further, unless otherwise defined herein, an arylalkyl group refers to a functional group (Ar—R—) in which a carbon atom of a straight-chain or branched alkyl group(R) is substituted by an aryl group (Ar) which is an aromatic hydrocarbon group.

Specifically, the arylalkyl group includes an arylalkyl group having 7 to 20 carbon atoms, and more specifically 7 to 12 carbon atoms.

Specific examples of the arylalkyl group may include a benzyl group and a phenylethyl group. Further, unless otherwise defined herein, an alkylaryl group refers to a functional group (R—Ar—) in which a carbon atom of an aromatic hydrocarbon group (Ar) is substituted by a straight-chain or branched alkyl group (R). Specifically, the alkylaryl group includes an alkylaryl group having 7 to 20 carbon atoms, and more specifically 7 to 12 carbon atoms.

Further, unless otherwise defined herein, an aryloxy group refers to an aryl group (—OAr) which is bonded via an oxygen, wherein the aryl group is as defined above. Specifically, the aryloxy group includes an aryloxy group having 6 to 20 carbon atoms, and more specifically 6 to 12 carbon atoms. Specific examples of the aryloxy group may include phenoxy or the like.

Further, unless otherwise defined herein, a silyl group refers to a —SiH$_3$ radical derived from silane, wherein at least one of hydrogen atoms in the silyl group may be substituted with various organic groups such as an alkyl group and a halogen group.

Further, unless otherwise defined herein, a nitro group refers to a —NO$_2$ radical in which one nitrogen atom and two oxygen atoms are bonded.

Further, unless otherwise defined herein, a sulfonate group refers to a functional group in which hydrogen in the sulfonic acid group (—SO$_3$H) is substituted with an alkyl group, wherein the alkyl group is as defined above. Specifically, the sulfonate group may be —SO$_3$R (where R is a straight-chain or branched alkyl group having 1 to 20 carbon atoms).

Further, unless otherwise defined herein, an amido group refers to an amino group bonded to a carbonyl group (C=O).

Further, unless otherwise defined herein, an alkylamino group refers to a functional group in which at least one hydrogen in the amino group (—NH$_2$) is substituted with an alkyl group, wherein the alkyl group is as defined above. Specifically, the alkylamino group may be —NR$_2$ (where each R may be a hydrogen atom or a straight-chain or branched alkyl group having 1 to 20 carbon atoms, with the proviso that both of two Rs are not hydrogen atoms).

Further, unless otherwise defined herein, an arylamino group refers to a functional group in which at least one hydrogen in the amino group (—NH$_2$) is substituted with an aryl group, wherein the aryl group is as defined above.

Further, unless otherwise defined herein, an alkylidene group refers to a divalent aliphatic hydrocarbon group in which two hydrogen atoms have been removed from the same carbon atom of the alkyl group. Specifically, the alkylidene group includes an alkylidene group having 1 to 20 carbon atoms, and more specifically 1 to 12 carbon atoms. Specific examples of the alkylidene group may include a propane-2-ylidene group, or the like.

Further, unless otherwise defined herein, a hydrocarbyl group refers to a monovalent hydrocarbon group having 1 to 60 carbon atoms consisting only of the carbon and hydrogen, regardless of its structure, such as an alkyl group, an aryl group, an alkenyl group, an alkylaryl group, and an arylalkyl group.

Further, unless otherwise defined herein, "combination thereof" means two or more functional groups bonding through a linking group such as a single bond, a double bond (ethylene group), a triple bond (acetylene group) or an alkylene group having 1 to carbon atoms (for example, a methylene group (—CH$_2$—), an ethylene group (—CH$_2$CH$_2$—) or the like), or two or more functional groups being fused and linked.

Transition Metal Compound

In one embodiment of the present invention, a Group 4 transition metal as a central metal is linked by a specific ligand structure rich in electrons and widely delocalized while having a rigid planar structure, and an amino group substituted with a silyl group, and therefore, a transition metal compound exhibiting excellent structural stability together with excellent polymerization reactivity is provided.

Specifically, the transition metal compound according to one embodiment of the present invention has a structure of the following Chemical Formula 1.

[Chemical Formula 1]

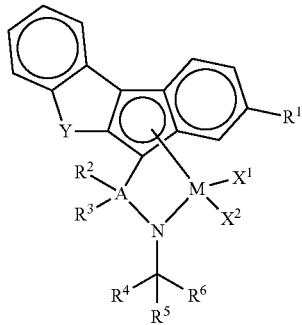

In Chemical Formula 1,
A is carbon (C), silicon (Si), or germanium (Ge);
Y is oxygen (O) or sulfur (S);
M is a Group 4 transition metal;
$X^1$ and $X^2$ are the same as or different from each other, and are each independently a halogen, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;
$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group:
$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring; and
$R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl.

Further, in Chemical Formula 1, the functional groups $R^1$ to $R^6$, $X^1$, and $X^2$ may each independently be further substituted with one or more substituents selected from the group consisting of a halogen group, an alkyl group having 1 to 20 carbon atoms, a haloalkyl group having 1 to 20 carbon atoms, an alkenyl group having 2 to 20 carbon atoms, an alkoxy group having 1 to 20 carbon atoms, a cycloalkyl group having 3 to 20 carbon atoms, an aryl group having 6 to 20 carbon atoms, an arylalkyl group having 7 to 20 carbon atoms, an alkylaryl group having 7 to 20 carbon atoms, and an aryloxy group having 6 to 20 carbon atoms.

In a transition metal compound according to the present invention, a Group 4 transition metal as a central metal is linked by an indeno-fused benzofuran or benzothiophene ligand having a specific structure and substituents rich in electrons and widely delocalized while having a rigid planar structure, and an amino group substituted with a silyl group, and therefore, the transition metal compound is capable of exhibiting excellent structural stability together with excellent polymerization reactivity by maintaining a pentagonal ring structure.

In the transition metal compound of Chemical Formula 1 according to one embodiment of the present invention, the metal site is linked by an indeno-fused benzofuran or benzothiophene ligand introducing an amino group substituted with a silyl group. As a result, approaches of monomers having large steric hindrance may be more facilitated and copolymerizability can be improved. In addition, in the transition metal compound of Chemical Formula 1, the indeno-fused benzofuran or benzothiophene ring, Si of the silyl group and nitrogen (N) of the amino group may form a more stable and rigid pentagonal ring structure with the central metal (M) due to ring-type bonding. In other words, the nitrogen atom of the amino group is linked by two bonds with the silyl group bridge in a ring form, and therefore, a more rigid complex compound structure may be obtained. Thus, when applied to olefin polymerization to improve copolymerizability under high temperature commercialization conditions, a large alpha-olefin as well as high molecular weight and low density polyolefin, particularly, linear low density polyethylene, can be introduced, and therefore an ultra-low density polyolefin copolymer having a density of 0.91 g/cc or less can be prepared.

In addition, various substituents may be introduced to the indeno-fused benzofuran or benzothiophene ring and the silyl group. As a result, electronic and steric environments around the metal may be controlled, and structures, physical properties, and the like of the produced polyolefin may be readily controlled. Accordingly, the transition metal compound of Chemical Formula 1 may be useful as a catalyst for preparing an olefin-based polymer, however, the use is not limited thereto, and the transition metal compound is capable of being applied in all usable fields.

Specifically, in Chemical Formula 1, M may be selected from the group consisting of titanium (Ti), zirconium (Zr), and hafnium (Hf), and more specifically, may be titanium (Ti).

In Chemical Formula 1, A may be selected from the group consisting of carbon, silicon, and germanium, and more specifically, may be silicon (Si).

In Chemical Formula 1, Y is O or S, and more specifically, may be S.

Further, in Chemical Formula 1, $X^1$ and $X^2$ may each independently be selected from the group consisting of a halogen, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a nitro group, an amido group, a substituted or unsubstituted alkylamino group having 1 to carbon atoms, a substituted or unsubstituted arylamino group having 6 to 20 carbon atoms, a substituted or unsubstituted alkylsilyl group having 1 to 20 carbon atoms, a substituted or unsubstituted alkoxy group having 1 to 20 carbon atoms, and a substituted or unsubstituted sulfonate group having 1 to 20 carbon atoms. More specifically, $X^1$ and $X^2$ may each independently be an alkyl group having 1 to 6 carbon atoms, and even more specifically, may be a methyl group or an ethyl group.

In Chemical Formula 1, $R^1$ may be selected from the group consisting of a substituted or unsubstituted alkyl group having 1 to 20 carbon atoms, a substituted or unsubstituted alkoxy group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to carbon atoms, and a substituted or unsubstituted arylalkyl group having 7 to 20 carbon atoms. Specifically, $R^1$ may be selected from the group consisting of an alkyl group having 1 to 8 carbon atoms, an alkoxy group having 1 to 8 carbon atoms, and an aryl group having 6 to 12 carbon atoms. More specifically, $R^1$ may be a methyl group, an ethyl group, a propyl group, an isopropyl group, an n-butyl group, a tert-butyl group, a pentyl group, a hexyl group, a heptyl group, an octyl group, a phenyl group, a halogen group, a methoxy group, or an ethoxy group.

Further, in Chemical Formula 1, $R^2$ and $R^3$ may each independently be selected from the group consisting of a hydrogen atom, a halogen group, a substituted or unsubstituted alkyl group having 1 to 20 carbon atoms, a substituted or unsubstituted alkenyl group having 2 to 20 carbon atoms, a substituted or unsubstituted alkoxyalkyl group having 2 to 20 carbon atoms, a substituted or unsubstituted aryl group having 6 to carbon atoms, a substituted or unsubstituted alkylaryl group having 7 to 20 carbon atoms, and a substituted or unsubstituted arylalkyl group having 7 to 20 carbon atoms, or $R^2$ and $R^3$ may be linked to each other to form a substituted or unsubstituted aliphatic or aromatic ring. Specifically, $R^2$ and $R^3$ may be linked to each other to form an aliphatic ring having 4 to 8 carbon atoms or an aromatic ring having 4 to 8 carbon atoms. Specifically, $R^2$ and $R^3$ may each independently be selected from the group consisting of an alkyl group having 1 to 6 carbon atoms and an aryl group having 6 to 12 carbon atoms, or $R^2$ and $R^3$ may be linked to each other to form an aliphatic or aromatic ring having 4 to 6 carbon atoms. More specifically, $R^2$ and $R^3$ may each independently be hydrogen, a methyl group, an ethyl group, a propyl group, an isopropyl group, an n-butyl group, a tert-butyl group, a methoxymethyl group, a tert-butoxymethyl group, a tert-butoxyhexyl group, a 1-ethoxyethyl group, a 1-methyl-1-methoxyethyl group, or a phenyl group.

Further, in Chemical Formula 1, $R^4$ to $R^6$ may each independently be selected from the group consisting of a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 20 carbon atoms, and a substituted or unsubstituted arylalkyl group having 7 to 20 carbon atoms, and these functional groups may be independently substituted with one or more substituents selected from the group consisting of a halogen group, an alkyl group having 1 to 10 carbon atoms, a haloalkyl group having 1 to 10 carbon atoms, an alkenyl group having 2 to 10 carbon atoms, an alkoxy group having 1 to 10 carbon atoms, a cycloalkyl group having 3 to 12 carbon atoms, an aryl group having 6 to 12 carbon atoms, an arylalkyl group having 7 to 12 carbon atoms, an alkylaryl group having 7 to 12 carbon atoms, and an aryloxy group having 6 to 12 carbon atoms. Specifically, $R^4$ to $R^6$ may be a straight-chain or branched alkyl group having 1 to 8 carbon atoms or an aryl group having 6 to 12 carbon atoms, and these functional groups may be independently substituted with one or more substituents selected from the group consisting of a halogen group, an alkyl group having 1 to 10 carbon atoms, and a haloalkyl group having 1 to 10 carbon atoms. More specifically, $R^4$ to $R^6$ may each independently be hydrogen, a methyl group, an ethyl group, a propyl group, or a phenyl group.

In Chemical Formula 1, more preferred compounds for controlling electronic and steric environments around the metal (M) may be more specifically selected from the group consisting of compounds represented by the following structural formulae.

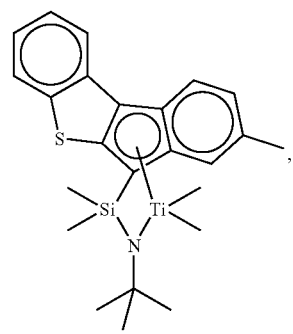

-continued

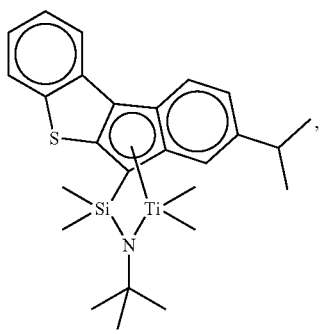

,

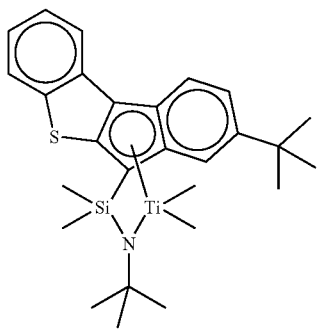

As will be described in more detail hereinafter, a transition metal compound of Chemical Formula 1 may be a final product produced by reacting a ligand compound having a specific structure with an organolithium-based compound and then reacting the resultant reaction product with a transition metal compound in the presence of a Grignard reagent or an organolithium-based compound, thereby introducing a transition metal group in a specific ligand compound.

Method for Preparing Transition Metal Compound

In another embodiment of the present invention, any one of several methods of preparing the aforementioned transition metal compounds is presented.

Specifically, a method for preparing a transition metal compound represented by the following Chemical Formula 1 is provided, including the steps of: reacting a ligand compound represented by the following Chemical Formula 2 with an organolithium-based compound, and then reacting the resultant reaction product with a compound represented by the following Chemical Formula 3, and a Grignard compound or an organolithium-based compound.

[Chemical Formula 1]

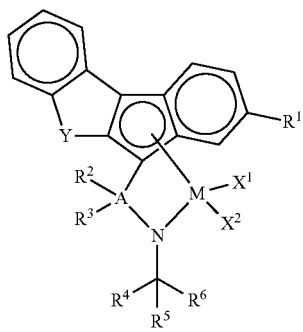

[Chemical Formula 2]

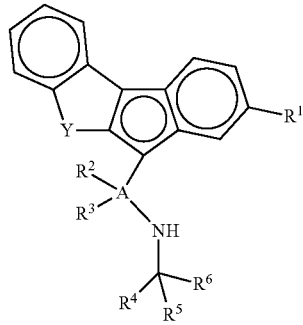

[Chemical Formula 3]

$M(X^1X^2)_2$

In Chemical Formulae 1, 2, and 3,

A is carbon, silicon, or germanium;

Y is O or S;

M is a Group 4 transition metal;

$X^1$ and $X^2$ are the same as or different from each other, and are each independently a halogen, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;

$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group;

$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring; and $R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl.

Here, detailed description of the structural formulae and substituents A, Y, M, $X^1$, $X^2$, and $R^1$ to $R^6$ related to Chemical Formula 1 are as previously described.

Meanwhile, the method for preparing a transition metal compound according to the present invention may further include a step of reacting a compound of the following Chemical Formula 4 with a compound of the following Chemical Formula 5 to prepare the ligand compound of Chemical Formula 2.

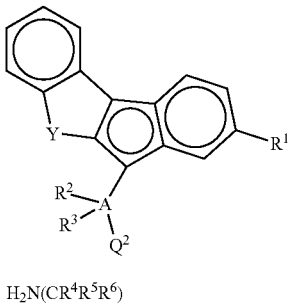

[Chemical Formula 4]

[Chemical Formula 5]

In Chemical Formulae 4 and 5,

A, Y, and $R^1$ to $R^6$ are as defined above, and $Q^2$ is a halogen group.

In addition, the method for preparing a transition metal compound according to the present invention may, before reacting the compound of Chemical Formula 4 with the compound of Chemical Formula 5, further include a step of reacting a compound of the following Chemical Formula 6 with a compound of the following Chemical Formula 7 in the presence of an organolithium-based compound to prepare the compound of Chemical Formula 4.

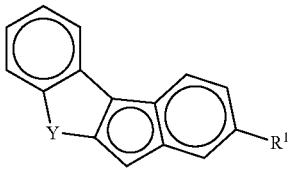

[Chemical Formula 6]

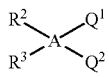

[Chemical Formula 7]

In Chemical Formulae 6 and 7,

A, Y, $R^1$ to $R^3$, and $Q^2$ are as described above, and $Q^1$ is a halogen group.

The transition metal compound according to the present invention has excellent structural stability together with excellent polymerization reactivity, and can exhibit excellent copolymerizability at a high temperature. As a result, the transition metal compound is useful for the preparation of olefin-based polymers, especially high molecular weight and low density polyethylene. In addition, since approaches of monomers having large steric hindrance are more facilitated structurally, it is possible to prepare a novel ligand compound and a novel transition metal compound containing the same, which are particularly useful for the preparation of copolymers of ethylene and alpha olefins.

In particular, the transition metal compound prepared according to the preparation method of the present invention can be used as a catalyst for preparing an olefin-based polymer. More specifically, in the compound of Chemical Formula 1, an indeno-fused benzofuran or benzothiophene ligand and an amino group are stably crosslinked by a bridge A, and the nitrogen atom of the amino group is coordinatively bonded to the center metal (M) in the transition metal compound, whereby a stable and rigid pentagonal ring structure can be formed. Consequently, not only are approaches of monomers having large steric hindrance facilitated, but also excellent copolymerizability under high temperature conditions can be exhibited. As a result, when applied to olefin polymerization, large quantities of alpha-olefin as well as high molecular weight and low density polyolefin, particularly, linear low density polyethylene, can be introduced, and therefore, an ultra-low density polyolefin copolymer having a density of 0.91 g/cc or less can be prepared.

Further, the compound of Chemical Formula 1 can control the electronic and steric environments around the metal by introducing a substituent into a specific site of the benzene ring of the indene group in the indeno-fused benzofuran or benzothiophene ligand, i.e., by substituting $R^1$ with a separate substituent other than hydrogen, and thereby the structure and physical properties of the produced polyolefin can be easily controlled. Specifically, in Chemical Formula 1, when $R^1$ is an alkyl group having 1 to 6 carbon atoms such as methyl, ethyl, propyl, isopropyl, n-butyl, t-butyl, pentyl, or hexyl, and more specifically an alkyl group having 2 to 6 carbon atoms, it can exhibit superior copolymerizability under high temperature conditions. Further, the transition metal compound prepared using the aforementioned ligand compound can exhibit high catalytic activity due to its electronic and steric structure in the process of preparing olefin-based polymers. Thus, an ultra-low density polyolefin copolymer can be prepared.

Specifically, the transition metal compound of Chemical Formula 1 according to an embodiment of the present invention can be prepared by reacting the compound of Chemical Formula 2 with the compound of Chemical Formula 3 as shown in Reaction Scheme 1 below. The following Reaction Scheme 1 is only one example for illustrating the present invention, but the present invention is not limited thereto.

[Reaction Scheme 1]

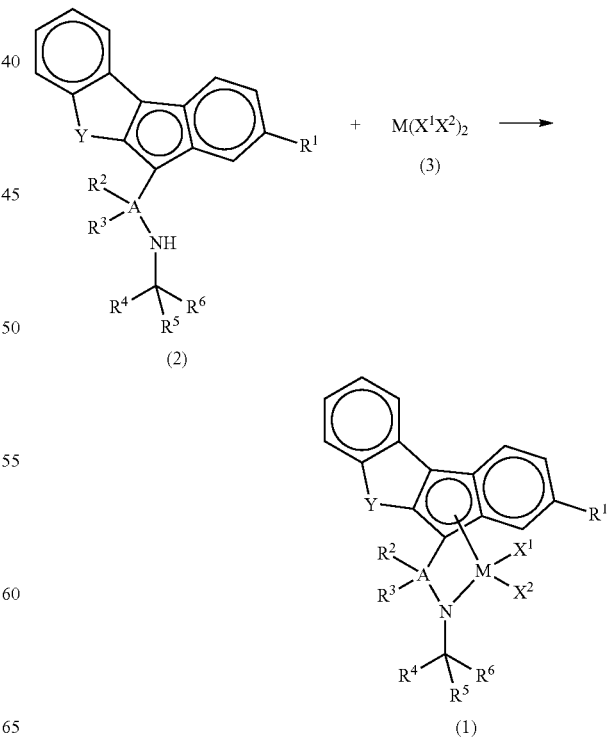

In Reaction Scheme 1, A, Y, M, $X^1$, and $X^2$, and $R^1$ to $R^6$ are as previously defined.

Meanwhile, in the preparation of the transition metal compound of Chemical Formula 1 according to the present invention, the organolithium-based compound specifically includes alkyllithium (R—Li, the alkyl group is as defined above, and specifically, a straight-chain alkyl group having 1 to 8 carbon atoms), cycloalkyl lithium (wherein the cycloalkyl group is as defined above, and specifically a cycloalkyl group having 3 to 12 carbon atoms), allyl lithium, vinyl lithium, aryl lithium (wherein the aryl group is as defined above, and specifically an aryl group having 6 to 12 carbon atoms), arylalkyl lithium (wherein the arylalkyl group is as defined above, and specifically an arylalkyl group having 7 to 12 carbon atoms), or alkylaryl lithium (wherein the alkylaryl group is as defined above, and specifically an alkylaryl group having 7 to 12 carbon atoms). More specifically, the organolithium-based compound includes methyl lithium, ethyl lithium, isopropyl lithium, n-butyllithium, sec-butyllithium, t-butyl lithium, isobutyl lithium, pentyl lithium, isopentyl lithium, cyclopentyl lithium, cyclohexyl lithium, hexyl lithium, octyl lithium, allyl lithium, vinyl lithium, phenyl lithium, benzyl lithium, and the like, and any one or a mixture of two or more thereof may be used. Among them, the organolithium-based compound may be methyl lithium, n-butyl lithium, t-butyl lithium, or a mixture thereof, in consideration of excellent reactivity.

The organolithium-based compound may be used in a stoichiometric ratio with respect to the ligand compound of Chemical Formula 2, and specifically, the ligand compound of Chemical Formula 2 and the organolithium-based compound may be used in a molar ratio of 1:1 to 1:3 and more specifically in a molar ratio of 1:1 to 1:2.

In addition, in the preparation of the transition metal compound of Chemical Formula 1 according to the present invention, the reaction of the ligand compound of Chemical Formula 2 and the organolithium-based compound may be carried out at a temperature of −90° C. to 10° C., and more specifically at a temperature of −78° C. to 10° C., and through the reaction of the ligand compound of Chemical Formula 2 and the organolithium-based compound, a dilithium compound is produced.

Next, in the preparation of the transition metal compound of Chemical Formula 1 according to the present invention, the compound of Chemical Formula 3, and a Grignard reagent or an organolithium-based compound are added to the reaction product obtained as a result of the reaction of the ligand compound of Chemical Formula 2 and an organolithium-based compound, and reacted. Herein, the organolithium-based compound may be the same as described above.

Specifically, the compound of Chemical Formula 3 may be $TiCl_4$, $ZrCl_4$, or $HfCl_4$, and any one or a mixture of two or more thereof may be used. In addition, the compound of Chemical Formula 3 may be used in an amount of 1 to 1.2 equivalents. Meanwhile, in the present invention, the equivalent refers to molar equivalent.

In addition, the Grignard reagent may specifically include a compound represented by the following Chemical Formula 13.

R'MgX          [Chemical Formula 13]

In Chemical Formula 13, R' is selected from the group consisting of an alkyl group having 1 to 20 carbon atoms, an aryl group having 6 to 20 carbon atoms, and an arylalkyl group having 7 to 20 carbon atoms, X is a halogen group.

More specifically, the Grignard reagent may be MeMgBr, EtMgCl (wherein Me is a methyl group and Et is an ethyl group), and the like, and may be used in an amount of 2 to 2.5 equivalents.

The reaction of the compound of Chemical Formula 3, and a Grignard reagent or an organolithium-based compound for the reaction product obtained as a result of the reaction between the compound of Chemical Formula 2 and the organolithium-based compound, may be carried out at a temperature of −90° C. to 10° C., and more specifically at a temperature of −78° C. to 10° C.

As an example, the transition metal compound of Chemical Formula 1 can be prepared by a method as shown in the following Reaction Scheme 2, but is not limited thereto.

The preparation method can be further specified in preparation examples described hereinafter.

[Reaction Scheme 2]

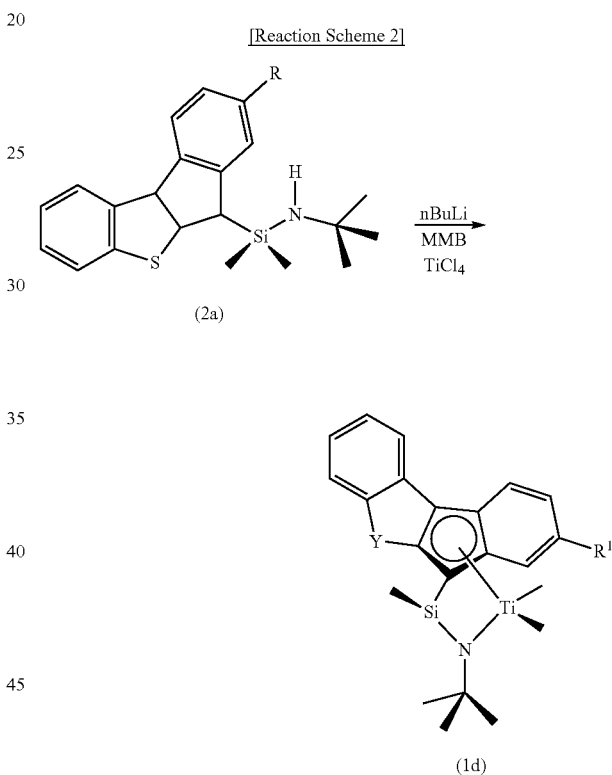

In Reaction Scheme 2, R may be H, methyl (Me), isopropyl (iPr), or t-butyl (tBu), but is not limited thereto.

Through the preparation processes as above, the transition metal compound of Chemical Formula 1 having a unique structure as described above and thereby having excellent polymerization reactivity and structural stability may be prepared.

Meanwhile, the ligand compound of Chemical Formula 2, which is a precursor compound used in the preparation of the transition metal compound of Chemical Formula 1 according to the present invention, can be prepared by the reaction of the compound of Chemical Formula 4 and the compound of Chemical Formula 5 as shown in the following Reaction Scheme 3. Reaction Scheme 3 is only an example for illustrating the present invention, and the present invention is not limited thereto.

[Reaction Scheme 3]

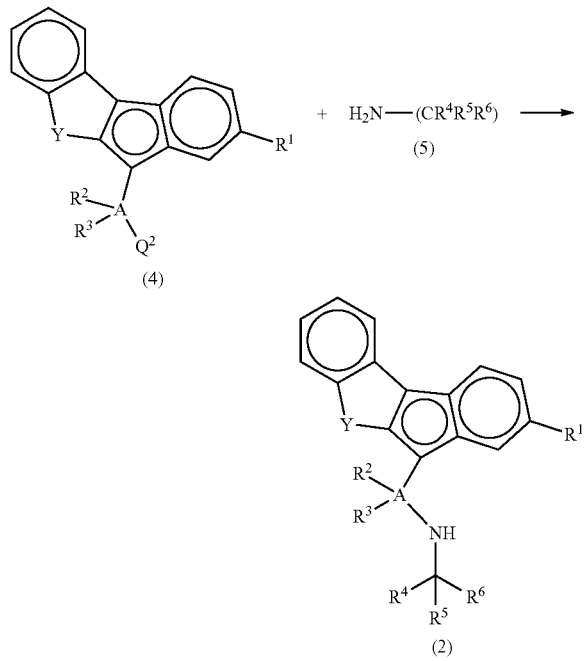

In Reaction Scheme 3, A, Y, $R^1$ to $R^6$, and $Q^2$ are as defined above.

The reaction of the compound of Chemical Formula 4 and the compound of Chemical Formula 5 may be carried out under a temperature condition of −80 to 50° C.

Further, the compound of Chemical Formula 4 and the compound of Chemical Formula 5 may be used in a stoichiometric ratio, and specifically, the compound of Chemical Formula 5 may be used in a molar ratio of about 5 to 10 equivalents, more specifically about 7 to 8 equivalents, based on 1 equivalent of the compound of Chemical Formula 4.

Further, the reaction may be carried out in a non-polar solvent such as toluene, pentane, hexane, or benzene.

Meanwhile, the compound of Chemical Formula 5, which can be used for the preparation of the compound of Chemical Formula 2, may specifically be a primary amine compound containing —$(CR^4R^5R^6)$, wherein $R^4$ to $R^6$ are as defined above.

More specifically, when considering the excellent catalytic activity and copolymerizability of the ligand compound and the transition metal compound finally prepared, in the compound of Chemical Formula 5, $R^4$ to $R^6$ may each independently be hydrogen, a C1 to C6 alkyl group, or a C6 to C12 aryl group, and still more specifically, $R^4$ to $R^6$ may each independently be a C1 to C4 alkyl group. Further, these functional groups may be substituted with one or more substituents selected from the group consisting of a halogen group, a C1 to C10 alkyl group, and a C1 to C10 haloalkyl group. As an example, the compound of Chemical Formula 5 may be t-BuNH$_2$, n-BuNH$_2$, or the like.

Further, the compound of Chemical Formula 4, which can be used for the preparation of the compound of Chemical Formula 2 by reacting with the compound of Chemical Formula 5, can be prepared using a conventional organic reaction, but the preparation method thereof is not particularly limited. In the present invention, the compound of Chemical Formula 4 may be prepared by reacting a compound of Chemical Formula 6 with a compound of Chemical Formula 7 in the presence of an organolithium-based compound as shown in the following Reaction Scheme 4. Accordingly, the method of preparing a ligand compound according to one embodiment of the present invention may further include a step of reacting a compound of the following Chemical Formula 6 with a compound of the following Chemical Formula 7 to prepare a compound of Chemical Formula 4.

[Reaction Scheme 4]

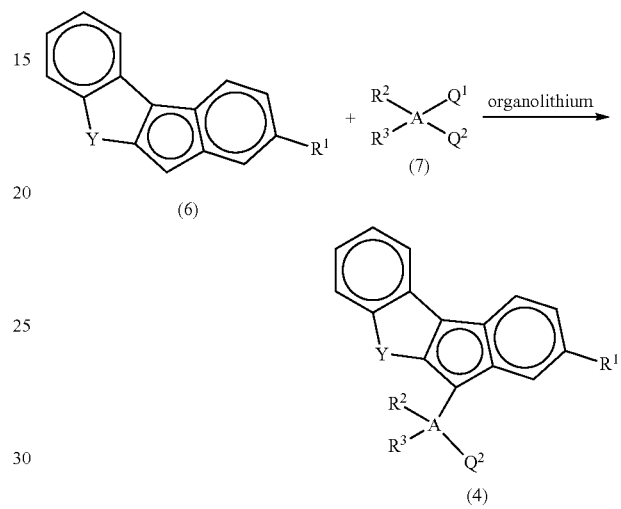

In Reaction Scheme 4, A, Y, $R^1$ to $R^3$, and $Q^2$ are as defined above, and $Q^1$ is a halogen group such as fluoro, bromo, chloro, or iodo. In this case, $Q^1$ may be the same as or different from $Q^2$.

Further, the compound of Chemical Formula 7, which can be used for the preparation of the compound of Formula 4 by reacting with the compound of Chemical Formula 6, may specifically be dichlorodimethylsilane (SiMe$_2$Cl$_2$) or the like. The compound of Chemical Formula 7 may be used in a stoichiometric ratio with respect to the compound of Chemical Formula 6, and specifically, the compound of Chemical Formula 7 may be used in an amount of about 1 to 5 equivalents, more specifically about 1 to 3 equivalents, based on 1 equivalent of the compound of Chemical Formula 6.

Further, the reaction for preparing the compound of Chemical Formula 4 may be carried out in an aprotic polar solvent such as tetrahydrofuran, dimethoxyethane, diethyl ether, or dichloromethane.

Meanwhile, the compound of Chemical Formula 6, which can be used for the preparation of the compound of Chemical Formula 4, is not particularly limited and may be prepared using conventional organic reactions.

Specifically, in the present invention, the compound of Chemical Formula 6 can be prepared by the preparation method including the steps of: (S1) preparing a compound of Chemical Formula 10 by performing Kumada coupling reaction of a compound of Chemical Formula 8 with a compound of Chemical Formula 9 in the presence of a catalyst; (S2) preparing a compound of Chemical Formula 12 by reacting the compound of Chemical Formula 10 with a carbonyl-based compound of Chemical Formula 11 in the presence of an organolithium compound; and (S3) performing Wolff-Kishner reaction of the compound of Chemical Formula 12 with hydrazine. Accordingly, the ligand compound according to the present invention may further include steps S3, S2+S3, or S1+S2+S3. The following Reaction Scheme 5 is only an example for illustrating the present invention, and the present invention is not limited thereto.

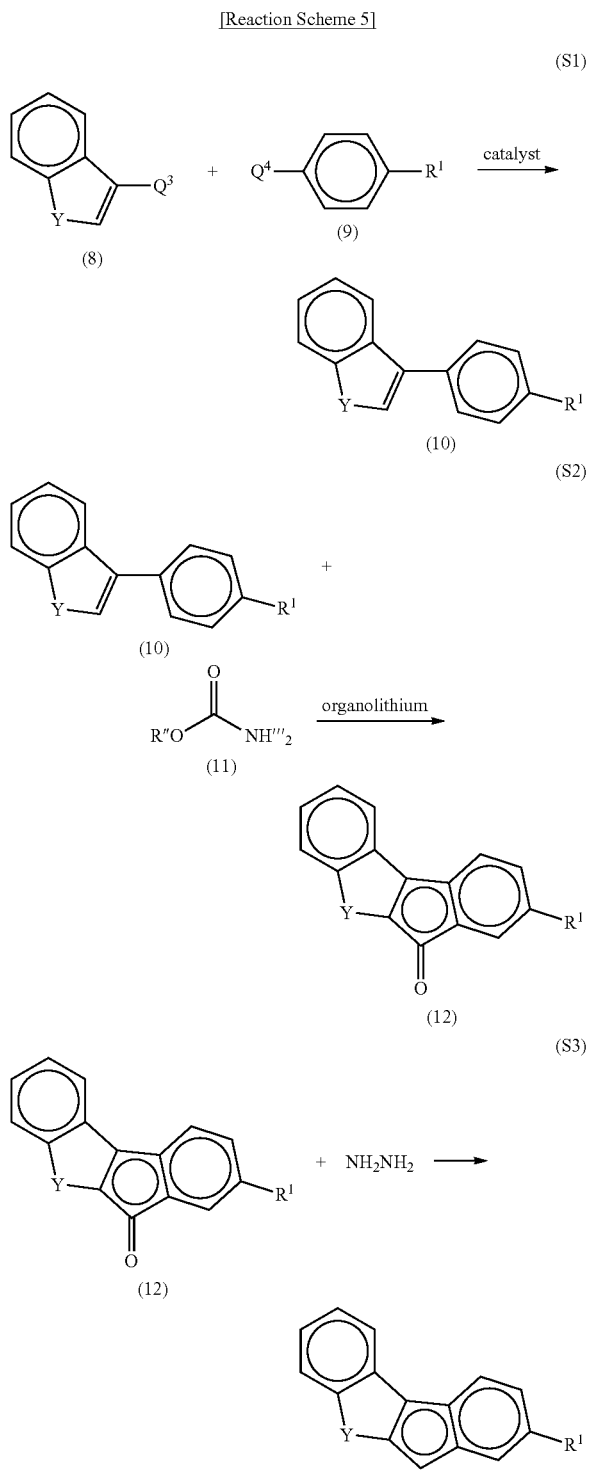

In Reaction Scheme 5,

Y, and $R^1$ are as defined above, $Q^3$ is a halogen group such as bromo, chloro, or iodine, or OTf (triflate, $CF_3SO_2O$—), and $Q^4$ is —$MgQ^{3'}$, where $Q^{3'}$ is the same as $Q^3$ defined above.

In Reaction Scheme 5, R" and R''' may each independently be a C1 to C6 alkyl group such as methyl, ethyl, or the like.

As the catalyst in step S1, nickel catalysts such as [1,3-bis(diphenylphosphino)propane]dichloronickel(II) ($NidpppCl_2$), $Ni(dppe)Cl_2$, $Ni(dppf)Cl_2$, $Ni(dppb)Cl_2$, $Ni(dppe)(OTf)_2$, $Ni(dppp)(OTf)_2$, $Ni(dppf)(OTf)_2$, or $Ni(dppb)(OTf)_2$; or palladium catalysts such as $Pd_2(dba)_3$, $Pd(PPh_3)_4$, or $Pd(PPh_3)_2Cl_2$ may be used. The catalyst may be used in an amount of 0.005 to 0.05 mol, more specifically 0.01 to 0.03 mol, based on 1 mol of the compound of Chemical Formula 8.

In step S1, the compound of Chemical Formula 8 and the compound of Chemical Formula 9 may be used in a stoichiometric ratio, and specifically, the compound of Chemical Formula 9 may be used in an amount of 1 to 1.5 mol, more specifically in an amount of 1 to 1.2 mol based on 1 mol of the compound of Chemical Formula 8, or it may be used in an amount of 1 to 1.5 equivalents, more specifically 1 to 1.2 equivalents based on 1 equivalent of the compound of Chemical Formula 8.

Meanwhile, in step S2, as the organolithium-based compound, the compounds as described above may be used. The organolithium-based compound may be used in a stoichiometric ratio with respect to the compound of Chemical Formula 10, and specifically, the organolithium-based compound may be used in an amount of 1 to 3 equivalents, more specifically 1.5 to 2.5 equivalents, based on 1 equivalent of the compound of Chemical Formula 10.

Further, during the reaction in step S2, a Lewis base such as hexamethylphosphoramide (HMPA), tetramethylethylenediamine (TMEDA), pentamethyldiethylenetriamine (PMDETA), 1,2-dimethoxyethane (glyme), bis(2-methoxyethyl)ether (diglyme), dioxan, or tetrahydrofuran (THF) may be used. The Lewis base may be used in a stoichiometric ratio with respect to the compound of Chemical Formula 10, and specifically, the Lewis base may be used in an amount of 1 to 3 equivalents, more specifically 1.5 to 2.5 equivalents, based on 1 equivalent of the compound of Chemical Formula 10.

Further, in step S2, the compound of Chemical Formula 11 may specifically be ethyl dimethyl carbamate ($CH_3CH_2OCON(CH_3)_2$) or the like. The compound of Chemical Formula 11 may be used in a stoichiometric ratio with respect to the compound of Chemical Formula 10, and specifically, the compound of Chemical Formula 11 may be used in an amount of 1 to 3 equivalents, more specifically 1 to 2.5 equivalents, based on 1 equivalent of the compound of Chemical Formula 10.

Further, in step S3, the Wolff-Kishner reaction may be carried out at a temperature of 70 to 90° C., and more specifically 70 to 80° C.

Further, in step S3, hydrazine can be used in a stoichiometric ratio with respect to the compound of Chemical Formula 12, and specifically, hydrazine can be used in an amount of 1 to 6 equivalents, more specifically, 3 to 5.5 equivalents, based on 1 equivalent of the compound of Chemical Formula 12.

As an example, the compound of Chemical Formula 5 can be prepared by a method as shown in the following Reaction Scheme 6, but is not limited thereto. The above preparation method can be further specified in preparation examples described hereinafter.

[Reaction Scheme 6]

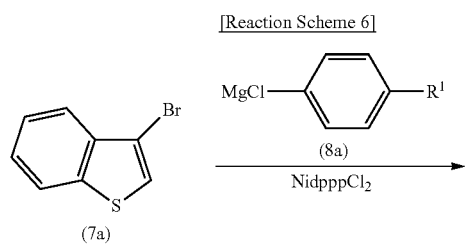

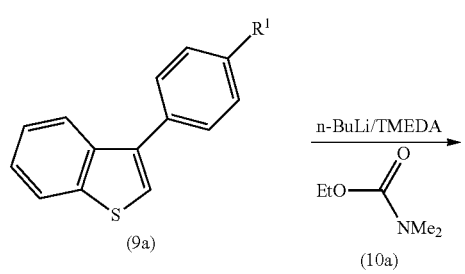

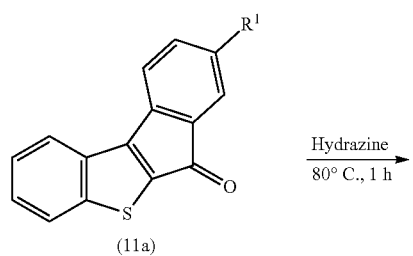

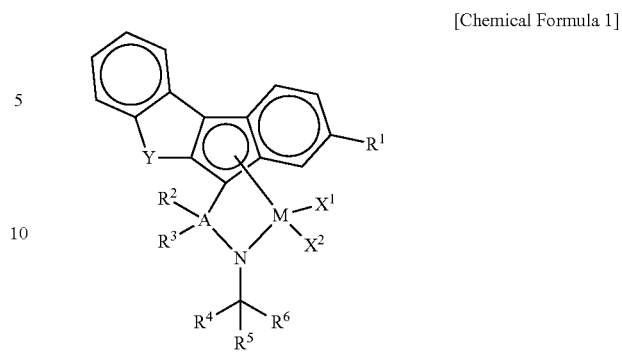

[Chemical Formula 1]

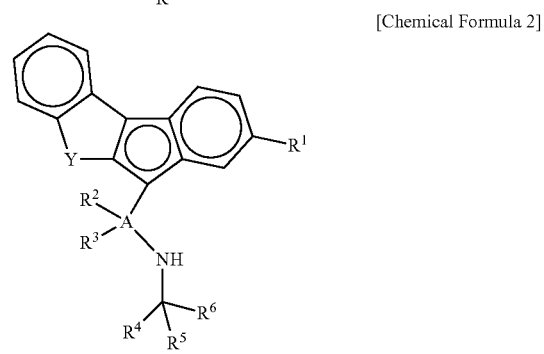

[Chemical Formula 2]

$M(X^1X^2)_2$

[Chemical Formula 3]

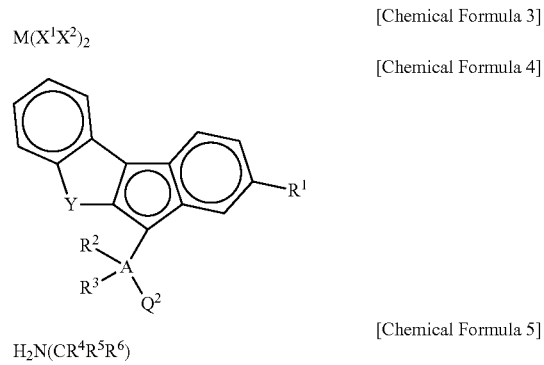

[Chemical Formula 4]

$H_2N(CR^4R^5R^6)$

[Chemical Formula 5]

In Reaction Scheme 6, $R^1$ is as defined above, and specifically, may be methyl, ethyl, or isopropyl.

Specifically, according to one embodiment of the present invention, a method for preparing a transition metal compound represented by the following Chemical Formula 1 is provided, including the steps of:

reacting a compound of the following Chemical Formula 4 with a compound of the following Chemical Formula 5 to prepare a ligand compound of the following Chemical Formula 2; and reacting the ligand compound of Chemical Formula 2 with an organolithium-based compound, and then reacting the resultant reaction product with a compound represented by the following Chemical Formula 3, and a Grignard compound or an organolithium-based compound.

In Chemical Formulae 1, 2, 3, 4, and 5,

A is carbon, silicon, or germanium;

Y is O or S;

M is a Group 4 transition metal;

$X^1$ and $X^2$ are the same as or different from each other, and are each independently a halogen group, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;

$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group;

$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring;

$R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl; and $Q^2$ is a halogen.

More specifically, according to another preferred embodiment of the present invention, a method for preparing a transition metal compound represented by the following Chemical Formula 1 is provided, including the steps of:

reacting a compound of the following Chemical Formula 6 with a compound of the following Chemical Formula 7 in the presence of an organolithium-based compound to prepare a ligand compound of the following Chemical Formula 4;

reacting the compound of Chemical Formula 4 with a compound of the following Chemical Formula 5 to prepare a ligand compound of the following Chemical Formula 2; and reacting the ligand compound of Chemical Formula 2 with an organolithium-based compound, and then reacting the resultant reaction product with a compound represented by the following Chemical Formula 3, and a Grignard compound or an organolithium-based compound.

[Chemical Formula 1]

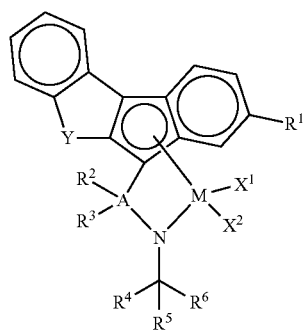

[Chemical Formula 2]

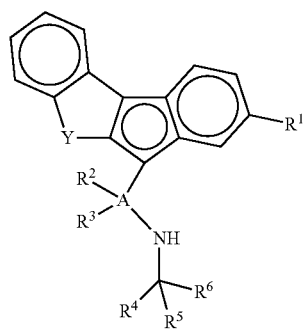

[Chemical Formula 3]

$M(X^1X^2)_2$

[Chemical Formula 4]

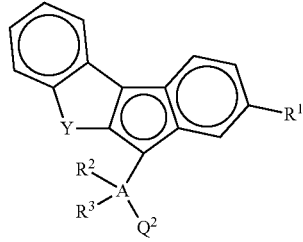

[Chemical Formula 5]

$H_2N(CR^4R^5R^6)$

[Chemical Formula 6]

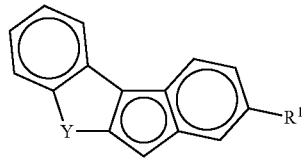

[Chemical Formula 7]

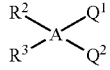

In Chemical Formulae 1, 2, 3, 4, 5, 6, and 7,

A, Y, and $R^1$ to $R^6$ are as defined above, and $Q^1$ and $Q^2$ are the same as or different from each other and each is independently a halogen group.

More specifically, according to another preferred embodiment of the present invention, a method for preparing a compound of the following Chemical Formula 1 is provided, including the steps of:

performing a Wolff-Kishner reaction of the compound of Chemical Formula 12 with hydrazine to prepare a compound of the following Chemical Formula 6;

reacting the compound of Chemical Formula 6 with a compound of the following Chemical Formula 7 in the presence of an organolithium-based compound to prepare a compound of the following Chemical Formula 4;

reacting the compound of Chemical Formula 4 with a compound of the following Chemical Formula 5 to prepare a ligand compound of the following Chemical Formula 2; and reacting the ligand compound of Chemical Formula 2 with an organolithium-based compound, and then reacting the resultant reaction product with a compound of the following Chemical Formula 3, and a Grignard compound or an organolithium-based compound.

[Chemical Formula 1]

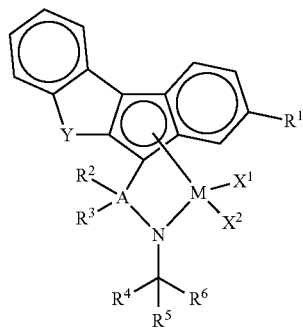

-continued

[Chemical Formula 2]

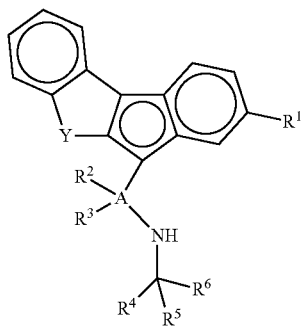

$M(X^1X^2)_2$

[Chemical Formula 3]

[Chemical Formula 4]

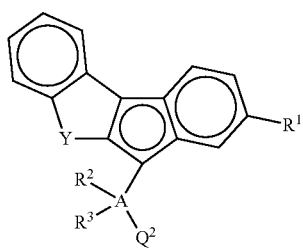

[Chemical Formula 5]

$H_2N(CR^4R^5R^6)$

[Chemical Formula 6]

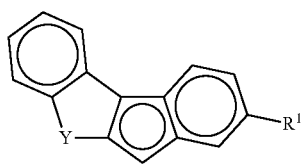

[Chemical Formula 12]

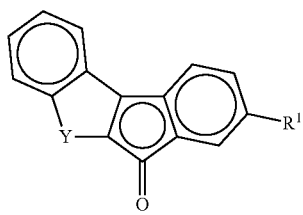

In Chemical Formulae 1, 2, 3, 4, 5, 6, 7, and 12,
A, Y, $R^1$ to $R^6$, $Q^1$, and $Q^2$ are as defined above.

More specifically, according to another preferred embodiment of the present invention, a method for preparing a compound of the following Chemical Formula 1 is provided, including the steps of:

performing a Kumada coupling reaction of a compound of the following Chemical Formula 8 with a compound of the following Chemical Formula 9 in the presence of a catalyst to prepare a compound of the following Chemical Formula 10;

reacting the compound of Chemical Formula 10 with a ketone-based compound of the following Chemical Formula 11 in the presence of an organolithium compound to prepare a compound of the following Chemical Formula 12;

performing a Wolff-Kishner reaction of the compound of Chemical Formula 12 with hydrazine to prepare a compound of the following Chemical Formula 6;

reacting the compound of Formula 6 with a compound of the following Chemical Formula 7 in the presence of an organolithium-based compound to prepare a compound of the following Chemical Formula 4;

reacting the compound of Formula 4 with a compound of the following Chemical Formula 5 to prepare a ligand compound of the following Chemical Formula 2; and reacting the ligand compound of Chemical Formula 2 with an organolithium-based compound and then reacting the resultant reaction product with a compound of the following Chemical Formula 3, and a Grignard compound or an organolithium-based compound.

[Chemical Formula 1]

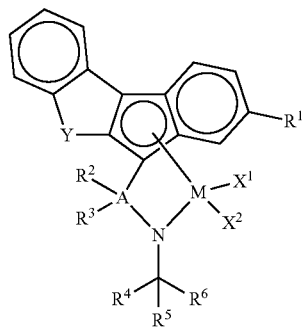

[Chemical Formula 2]

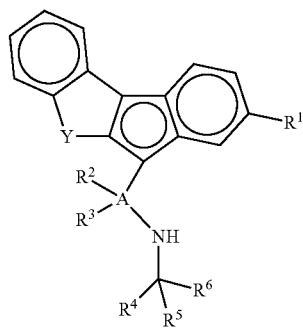

[Chemical Formula 3]

$M(X^1X^2)_2$

[Chemical Formula 4]

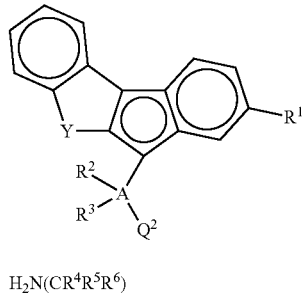

[Chemical Formula 5]

$H_2N(CR^4R^5R^6)$

[Chemical Formula 6]

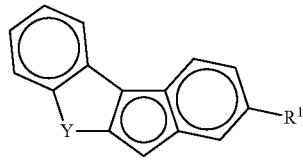

[Chemical Formula 7]

[Chemical Formula 8]

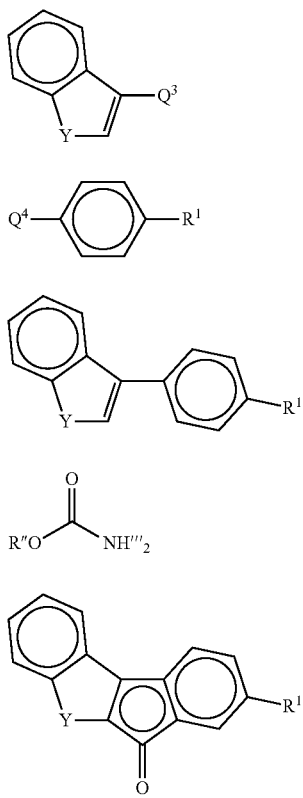

[Chemical Formula 9]

[Chemical Formula 10]

[Chemical Formula 11]

[Chemical Formula 12]

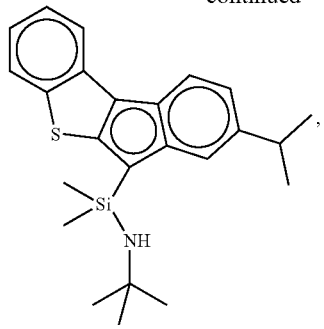

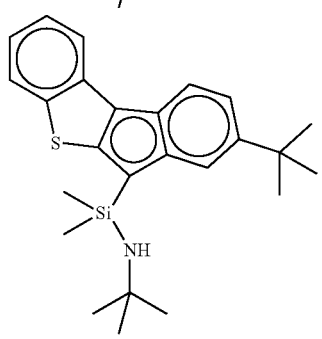

In Chemical Formulae 1, 2, 3, 4, 5, 6, 7, 8, 9, 10, 11, and 12,

A, Y, $R^1$ to $R^6$, $Q^1$, and $Q^2$ are as defined above, $Q^3$ is a halogen group or —$OSO_2CF_3$, $Q^4$ is —$MgQ^{3'}$, wherein $Q^{3'}$ is the same as $Q^3$ as defined above, and R'' and R''' are each independently a C1 to C6 alkyl group.

The transition metal compound of Chemical Formula 1 can be prepared with high purity and a high yield by the method as described above.

In Chemical Formula 2, more preferred compounds for controlling electronic and steric environments around the metal (M) may be more specifically represented by one of the following structural formulae.

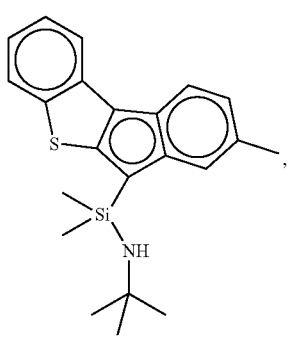

Catalyst Composition

In another embodiment of the present invention, a catalyst composition including the aforementioned transition metal compound is provided.

Specifically, the catalyst composition includes the transition metal compound of Chemical Formula 1, and optionally, may further include a co-catalyst capable of acting as a counter ion, that is, an anion having weak bonding strength while cationizing the central metal, preferably by extracting X1 and X2 ligands in the transition metal complex, so that the transition metal compound of Chemical Formula 1 becomes an active catalyst component used in the preparation of an ethylene homopolymer or a copolymer of ethylene and alpha-olefin.

As an example, the co-catalyst may include any one or a mixture of two or more selected from the group consisting of compounds of the following Chemical Formulae 14 to 16.

$A(R^7)_3$      [Chemical Formula 14]

$[L-H]^+[W(D)_4]^-$      [Chemical Formula 15]

$[L]^+[W(D)_4]^-$      [Chemical Formula 16]

In Chemical Formulae 14 to 16, each of $R^7$ is independently selected from the group consisting of a halogen group, a hydrocarbyl group having 1 to 20 carbon atoms, and a hydrocarbyl group having 1 to 20 carbon atoms substituted with a halogen group;

A is boron;

each D is independently an aryl group having 6 to 20 carbon atoms or an alkyl group having 1 to 20 carbon atoms in which one or more hydrogen atoms may be substituted with a substituent, the substituent being at least any one selected from the group consisting of a halogen, a hydrocarbyl group having 1 to 20 carbon atoms, an alkoxy group having 1 to 20 carbon atoms, and an aryloxy group having 6 to 20 carbon atoms;

$[L-H]^+$ is a Brønsted acid, wherein H is a hydrogen atom;

$[L]^+$ is a cationic Lewis acid; and

W is a group 13 element.

In the co-catalyst, the compounds of Chemical Formula 14 function as an alkylating agent for the transition metal compound, and the compounds of Chemical Formulae 15 and 16 function as an activating agent for the transition metal compound or the alkylated transition metal compound.

As an example, the compound of Chemical Formula 14 may be more specifically an alkylboron, wherein the alkyl group is as defined above. More specifically, the compound of Chemical Formula 14 may include trimethylboron, triethyl boron, triisobutyl boron, tripropyl boron, tributyl boron, and the like, and any one or a mixture of two or more thereof may be used.

In addition, the compounds of Chemical Formulae 15 and 16 include a non-coordinative bonding anion compatible with a cation that is a Brønsted acid, wherein the anion may contain a single coordinative bonding complex compound having a relatively large size and including metalloids. More specifically, the compounds of Chemical Formulae 15 and 16 may each be a salt containing an anion including a coordinative bonding complex compound containing a single boron atom in the anion part.

Specific examples of such compounds may include trialkyl ammonium salts such as trimethyl ammonium tetrakis(pentafluorophenyl)borate, triethyl ammonium tetrakis(pentafluorophenyl)borate, tripropyl ammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethyl anilinium tetrakis(pentafluorophenyl)borate, N,N-dimethyl anilinium n-butyltris(pentafluorophenyl)borate, N,N-dimethyl anilinium benzyltris(pentafluorophenyl)borate, N,N-dimethyl anilinium tetrakis(4-(t-butyldimethylsilyl)-2,3,5,6-tetrafluorophenyl)borate, N,N-dimethyl anilinium tetrakis(4-triisopropylsilyl)-2,3,5,6-tetrafluorophenyl)borate, N,N-dimethyl anilinium pentafluorophenoxy tris(pentafluorophenyl)borate, N,N-diethyl anilinium tetrakis(pentafluorophenyl)borate, N,N-dimethyl-2,4,6-trimethyl anilinium tetrakis(pentafluorophenyl)borate, trimethyl ammonium tetrakis(2,3,4,6-tetrafluorophenyl)borate, triethyl ammonium tetrakis(2,3,4,6-tetrafluorophenyl)borate, tripropyl ammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethyl anilinium tetrakis(2,3,4,6-tetrafluorophenyl)borate, N,N-diethylanilinium tetrakis(2,3,4,6-tetrafluorophenyl)borate, N,N-dimethyl-2,4,6-trimethyl anilinium tetrakis(2,3,4,6-tetrafluorophenyl)borate, decyldimethyl ammonium tetrakis(pentafluorophenyl)borate, dodecyldimethyl ammonium tetrakis(pentafluorophenyl)borate, tetradecyldimethyl ammonium tetrakis(pentafluorophenyl)borate, hexadecyldimethyl ammonium tetrakis(pentafluorophenyl)borate, octadecyldimethyl ammonium tetrakis(pentafluorophenyl)borate, eicosyldimethyl ammonium tetrakis(pentafluorophenyl)borate, methyldidecyl ammonium tetrakis(pentafluorophenyl)borate, methyldidodecyl ammonium tetrakis(pentafluorophenyl)borate, methylditetradecyl ammonium tetrakis(pentafluorophenyl)borate, methyldihexadecyl ammonium tetrakis(pentafluorophenyl)borate, methyldioctadecyl ammonium tetrakis(pentafluorophenyl)borate, methyldieicosyl ammonium tetrakis(pentafluorophenyl)borate, tridecyl ammonium tetrakis(pentafluorophenyl)borate, tridodecyl ammonium tetrakis(pentafluorophenyl)borate, tritetradecyl ammonium tetrakis(pentafluorophenyl)borate, trihexadecyl ammonium tetrakis(pentafluorophenyl)borate, trioctadecyl ammonium tetrakis(pentafluorophenyl)borate, trieicosyl ammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecyl anilinium tetrakis(pentafluorophenyl)borate, N-methyl-N-dodecyl anilinium tetrakis(pentafluorophenyl)borate, or methyldi(dodecyl)ammonium tetrakis(pentafluorophenyl)borate; dialkyl ammonium salts such as di-(i-propyl)ammonium tetrakis(pentafluorophenyl)borate or dicyclohexyl ammonium tetrakis(pentafluorophenyl)borate; carbonium salts such as tropylium tetrakis(pentafluorophenyl)borate, triphenyl methylium tetrakis(pentafluorophenyl)borate, or benzene(diazonium) tetrakis(pentafluorophenyl)borate, or the like, and any one, or a mixture of two or more thereof, may be used. Even more specifically, the compounds of Chemical Formulae 15 and 16 may include N,N-dimethyl anilinium tetrakis(pentafluorophenyl)borate, tributyl ammonium tetrakis(pentafluorophenyl)borate, di(octadecyl) methyl ammonium tetrakis(pentafluorophenyl)borate, di(octadecyl) (n-butyl)ammonium tetrakis(pentafluorophenyl)borate, triphenyl methylium tetrakis(pentafluorophenyl)borate, tropylium tetrakis(pentafluorophenyl)borate, or the like.

Solution polymerization is carried out in a solvent such as hexane at an elevated temperature of about 150° C. using such a borate-based co-catalyst. If an aluminum-based co-catalyst such as methylaluminoxane is used in place of the borate-based co-catalyst, there is a disadvantage that the co-catalyst may be precipitated in the form of a slurry and the aluminum-based co-catalyst must be excessively added for conversion to an active species.

Meanwhile, in the present invention, the borate-based co-catalyst may be contained in an amount of 1.5 to 10 equivalents based on the transition metal compound.

The transition metal compound of Chemical Formula 1 and the co-catalyst may be used in a form supported on a carrier. In this case, an inorganic carrier such as silica or alumina may be used as the carrier. Using in a form supported on an inorganic carrier as above may be useful for slurry polymerization or gas-phase polymerization in the polymerization for preparing an olefin-based polymer thereafter.

As an example, the catalyst composition having compositions as above may be prepared in accordance with conventional methods, and specifically, may be prepared by a preparation method (first method) including obtaining a mixture by bringing the transition metal compound of Chemical Formula 1 into contact with the alkylating agent of Chemical Formula 14, and adding the activating agent of Chemical Formula 15 or 16 to the mixture, or may be prepared by a preparation method (second method) including bringing the transition metal compound of Chemical Formula 1 into contact with the activating agent of Chemical Formula 15 or 16.

In the first method, a molar ratio of the alkylating agent of Chemical Formula 14 relative to the transition metal compound of Chemical Formula 1 may be from 1:2 to 1:5000, more specifically from 1:10 to 1:1,000, and even more specifically from 1-20 to 1:500. In addition, a molar ratio of the activating agent of Chemical Formula 15 or 16 relative to the transition metal compound of Chemical Formula 1 may be form 1:1 to 1:25, more specifically from 1:1 to 1:10, and even more specifically from 1:1 to 1:5. When a molar ratio of the alkylating agent of Chemical Formula 14 relative to the transition metal compound of Chemical Formula 1 is less than 1:2, the amount of the alkylating agent is excessively small, which may lead to concern of the transition metal compound alkylation not being sufficiently progressed, and when the molar ratio is greater than 1:5000, activation of the alkylated transition metal compound may be difficult due to a side reaction between the excess alkylating agent and the activating agent of Chemical Formula 15 or 16 added afterward. In addition, when a molar ratio of the activating agent of Chemical Formula 15 or 16 relative to the transition metal compound of Chemical Formula 1 is less than 1:1, the amount of the activating agent is relatively small causing insufficient activation of the transition metal compound, which may lead to concern of greatly reducing activity of the produced catalyst composition, and when the molar ratio is greater than 1:25, it may cause concern of cost increases in preparing the catalyst composition due to excessive use of the activating agent, and decrease in the purity of the produced polymer.

In the second method, a molar ratio of the activating agent of Chemical Formula 15 or 16 relative to the transition metal compound of Chemical Formula 1 may be from 1:1 to 1:500, more specifically from 1:1 to 1:50, and even more specifically from 1:2 to 1:25. When the molar ratio is less than 1:1, the amount of the activating agent is relatively small causing incomplete activation of the transition metal compound, which may lead to concern of reducing activity of the produced catalyst composition, and when the molar ratio is greater than 1:500, it may cause concern of cost increases in preparing the catalyst composition due to excessive use of the activating agent, and decrease in the purity of the produced polymer.

Meanwhile, in the preparation of the catalyst composition, aliphatic hydrocarbon-based solvents such as pentane, hexane, or heptane, or aromatic-based solvents such as benzene or toluene, may be used as a reaction solvent, however, the solvent is not limited thereto, and all solvents capable of being used in the art may be used.

As described above, the catalyst composition according to one embodiment of the present invention includes the transition metal compound of Chemical Formula 1 having excellent structural stability as well as being structurally very facilitating of monomer approaches, and thereby may exhibit excellent polymerization reactivity, and particularly, may exhibit excellent reactivity for olefin monomers having large steric hindrance.

In addition, by including the co-catalyst as above together with the transition metal compound, the co-catalyst activates the transition metal compound to an appropriate degree and suppresses the production of excessively long polymer chains in the preparation of an olefin-based polymer, while the transition metal compound and the co-catalyst randomize bonding of olefin-based monomers, and thereby, an olefin-based polymer having a low crystallization temperature and melting temperature as well as having low density may be prepared.

Meanwhile, the catalyst composition of the present invention includes the transition metal compound of Chemical Formula 1 and can exhibit excellent catalytic activity. Specifically, the catalytic activity represented by the total yield of the produced olefin polymer (kg•polyolefin/mmol•transition metal compound) relative to the molar ratio of the transition metal compound added may be about 3.5 kg/mmol or more, about 3.5 to 50 kg/mmol, about 4.0 kg/mmol or more, about 4.0 to 50 kg/mmol, about 4.5 kg/mmol or more, or about 4.5 to 50 kg/mmol.

The catalyst composition is capable of being used in various fields, and among these, may be useful in preparing an olefin-based polymer, particularly, in preparing a low density ethylene polymer or a copolymer of ethylene and alpha-olefin.

Olefin-Based Polymer

Another embodiment of the present invention provides an olefin-based polymer prepared using the aforementioned catalyst composition.

The olefin-based polymer may be prepared in accordance with conventional methods for preparing an olefin-based polymer except that the catalyst composition is used. Specifically, the olefin-based polymer can be prepared by bringing the aforementioned catalyst composition into contact with one or more olefin monomers to perform polymerization reaction, and thereby, may be prepared into an olefin-based homopolymer or copolymer. Specifically, the olefin-based polymer may be polyethylene, and particularly, may be an ethylene homopolymer, or a copolymer of ethylene and alpha-olefin.

The polymerization for the preparation of the olefin-based polymer may be carried out in accordance with various methods such as slurry polymerization, liquid-phase polymerization, gas-phase polymerization, or bulk polymerization, and more specifically, may be carried out through liquid-phase polymerization.

When the polymerization is carried out through liquid-phase polymerization, olefin monomers may be dissolved or diluted in a solvent for polymerization such as an aliphatic hydrocarbon solvent having 5 to 12 carbon atoms (e.g., pentane, hexane, heptane, nonane, decane, isomers thereof, or the like), an aromatic hydrocarbon solvent having 6 to 20 carbon atoms (e.g., toluene, benzene, or the like), or a chlorinated hydrocarbon-based solvent (e.g., dichloromethane, chlorobenzene, or the like) to be used. In this case, small amounts of water, air, or the like acting as catalyst poisons for the solvent for polymerization may be removed using an alkyl aluminum.

In addition, specific examples of the monomer for preparing the olefin-based polymer may include ethylene, alpha-olefin, cyclic olefin, or the like, and diene olefin-based monomers or triene olefin-based monomers having two or more double bonds, and the like, may also be used. More specifically, examples of the olefin-based monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, 2,3-diisopropenylidene-5-norbornene, 2-ethylidene-3-isopropylidene-5-norbornene, 2-propenyl-2,5-norbornadiene, 1,3,7-octatriene, 1,4,9-decatriene, or the like, and any one, or a mixture of two or more thereof, may be used.

Further, when preparing a copolymer of ethylene and α-olefin as the olefin-based polymer, an α-olefin having 3 to 18 carbon atoms may be used as a co-monomer together with ethylene. Specifically, the α-olefin may include propylene, 1-butene, 1-pentene, 4-methyl-1-pentene, 1-hexene, 1-octene, 1-decene, 1-dodecene, 1-hexadecene, 1-octadecene, or the like, and any one, or a mixture of two or more thereof, may be used. More specifically, 1-butene, 1-hexene, 1-octene, or 1-decene may be used.

Further, when preparing the copolymer, the α-olefin may be used in an amount such that the content of ethylene in the finally prepared copolymer is 50% by weight or more, more specifically 60% by weight or more, and even more specifically from 60% to 99% by weight.

Further, a process for preparing the olefin polymer may be carried out at 20° C. to 500° C., more specifically at 25° C. to 200° C., and even more specifically at 50° C. to 100° C. Herein, the reaction pressure may be from 0.1 to 7 bar, and more specifically from 1 to 5 bar.

The polymer prepared using the preparation method as above has high molecular weight and low density by using the catalyst composition including the transition metal compound of Chemical Formula 1.

In particular, the olefin polymer according to the present invention is characterized by being excellent in copolymerizability and molecular weight, and having a higher molecular weight even at the same density. Specifically, the polymer may have a low density of 0.91 g/cc or less, 0.860 to 0.910 g/cc, 0.89 g/cc or less, 0.865 to 0.890 g/cc, 0.886 g/cc or less, or 0.868 to 0.886 g/cc. At the same time, the polymer may have a melt index (MI) at a load of 2.16 kg of 1.5 g/10 min or less, 0.01 to 1.5 g/10 min, 1.0 g/10 min or less, 0.03 to 1.0 g/10 min, 0.9 g/10 min or less, or 0.05 to 0.9 g/10 min.

As described above, the olefin polymer of the present invention can exhibit excellent mechanical properties such as rigidity and impact resistance by having low density and high molecular weight properties. In the present invention, the melt index may be measured in accordance with the ASTM D-1238 (condition E, 190° C., load of 2.16 kg). As described above, according to the present invention, it is possible to prepare a high molecular weight polymer having a low density of about 0.91 g/cc or less but having a melt index (MI) of 1.5 g/10 min or less, a high molecular weight polymer having a low density of about 0.89 g/cc or less but having a melt index (MI) of 1 g/10 min or less, or having a low density of about 0.886 g/cc or less but having a melt index (MI) of 0.9 g/10 min or less.

The polymer may have a molecular weight distribution (MWD) of 1.8 to 2.5 and a weight average molecular weight (Mw) of 100,000 to 200,000.

Further, in addition to the low density and high molecular weight properties, the polymer may have a crystallization temperature ($T_c$) of 78.0° C. or lower, 30 to 78.0° C., 65° C. or lower, 35 to 65° C., 63° C. or lower, or 35 to 63° C.; and a melting temperature ($T_m$) of 115.0° C. or less, 50 to 115.0° C., 80° C. or less, 55 to 80° C., 78° C. or lower, or 55 to 78° C. By having a lower crystallization temperature and melting temperature compared to existing olefin-based polymers, superior processability may be obtained.

In the present invention, the crystallization temperature ($T_c$) and melting temperature ($T_m$) may be measured using a differential scanning calorimeter (DSC) 2920 manufactured by TA Instruments. In this case, the measured values are obtained through second melt raising the temperature by 10° C. per minute in order to remove thermal history of the polymer. In the measured DSC curve, Tc is a maximum point of the exothermic peak in the cooling, and Tm is a maximum point of the endothermic peak in the second temperature raising.

The olefin-based polymer having physical properties as above may be used in various fields and applications such as for automobiles, for wires, for toys, for fibers, for medicines, for construction, or for consumer goods.

Hereinafter, preferred examples will be provided to assist the understanding of the present invention. However, the following examples are for illustrative purposes only and are not intended to limit the scope of the present invention.

EXAMPLES

<Preparation of Transition Metal Compound>

Organic reagents and solvents were purchased from Aldrich and purified by standard methods to be used unless particularly mentioned otherwise.

Contact with air and moisture was blocked in all synthesis steps to thereby enhance the reproducibility of experiments.

Preparation Example 1

A ligand compound (2a) and a transition metal compound (1a) were prepared through the same processes as in the following Reaction Scheme 7.

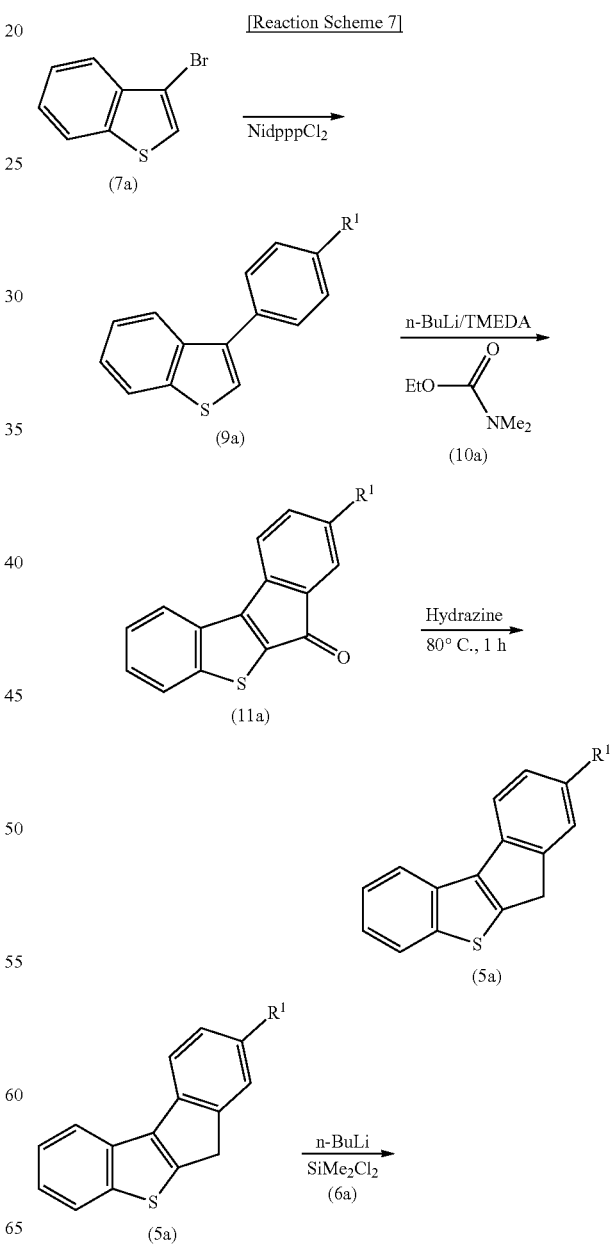

-continued

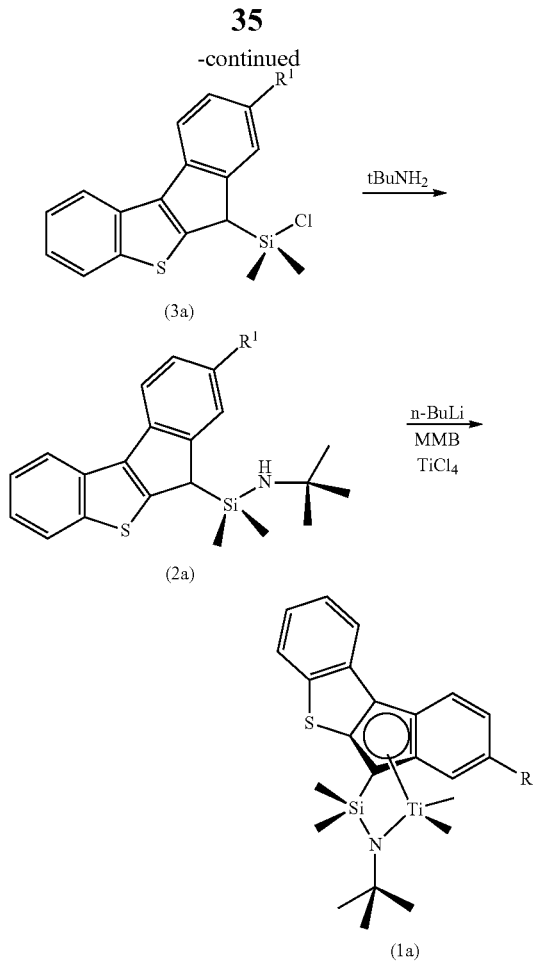

In Reaction Scheme 7, R is a methyl group.
Step 1) Preparation of Ligand Compound (2a)

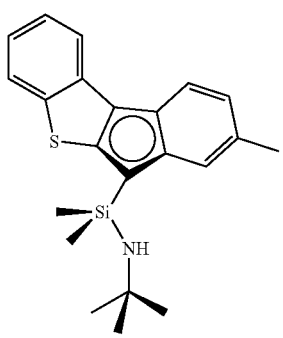

3-bromothianaphthene (7a) (10 g, 46.9 mmol) and p-tolylmagnesium bromide (1.2 eq., 56.3 mmol) were reacted in the presence of NdpppCl$_2$ ([1,3-bis (diphenylphosphino)propane]dichloronickel(II), 2 mol %, 508 g, 0.94 mmol) to prepare the compound of Chemical Formula 9a. Here, equivalent (eq.) refers to molar equivalent (eq./mol).

Then, the prepared compound of Chemical Formula 9a was reacted with the compound of Chemical Formula 10a (1.0 eq., 55.4 mmol) in tetramethylethylenediamine (TMEDA, 2.2 eq. 122 mmol) in the presence of n-butyllithium (n-BuLi, C$_4$H$_9$Li, 2.2 eq., 122 mmol) to prepare the compound of Chemical Formula 11a.

The prepared compound of Chemical Formula 11a was reacted with hydrazine (5.3 eq., 101 mmol) at 80° C. for 1 hour and under reflux in diethylene glycol solvent to prepare the compound of Chemical Formula 5a. Then, n-BuLi (1.05 eq.) and SiMeCl$_2$ (3.0 eq.) were added and reacted to prepare the compound of Chemical Formula 3a.

The prepared compound of Chemical Formula 3a was reacted with t-BuNH$_2$ (8.0 eq.) to obtain a ligand compound of Chemical Formula 2a.

Compound 9a: $^1$H NMR (500 MHz, C$_6$D$_6$, 7.15 ppm): δ 2.159 (s, 3H), 6.987-7.134 (m, 4H), 7.332-7.347 (d, 2H), 7.608-7.623 (d, 1H), 7.883-7.898 (d, 1H).

Compound 10a: $^1$H NMR (500 MHz, C$_6$D$_6$, 7.15 ppm): δ 1.898 (s, 3H), 6.731-6.748 (d, 1H), 6.863-6.877 (d, 1H), 6.910-6.943 (t, 1H), 7.022-7.054 (t, 1H), 7.205-7.236 (dd, 2H), 7.581-7.597 (d, 1H).

Compound 5a: $^1$H NMR (500 MHz, C$_6$D$_6$, 7.15 ppm): δ 2.250 (s, 3H), 3.365 (s, 2H), 6.943 (s, 1H), 7.093-7.124 (t, 2H), 7.247-7.277 (t, 1H), 7.618-7.658 (dd, 2H), 8.016-8.032 (d, 1H).

Compound 3a: $^1$H NMR (500 MHz, C$_6$D$_6$, 7.15 ppm): δ –0.020 (s, 3H), 0.028 (s, 3H), 2.293 (s, 3H), 3.772 (s, 1H), 7.093-7.134 (m, 2H), 7.249-7.279 (t, 1H), 7.410 (s, 1H), 7.606-7.622 (d, 1H), 7.738-7.754 (d, 1H), 8.041-8.057 (d, 1H)

Compound 2a: $^1$H NMR (500 MHz, C$_6$D$_6$, 7.15 ppm): δ –0.0281 (s, 3H), 0.154 (s, 3H), 1.110 (s, 9H), 2.390 (s, 3H), 3.363 (s, 1H), 7.246-7.313 (m, 2H), 7.417 (s, 1H), 7.619-7.661 (dd, 1H), 7.703-7.719 (d, 1H), 7.841-7.857 (d, 1H), 8.123-8.139 (d, 1H).

Step 2) Preparation of Transition Metal Compound (1a)

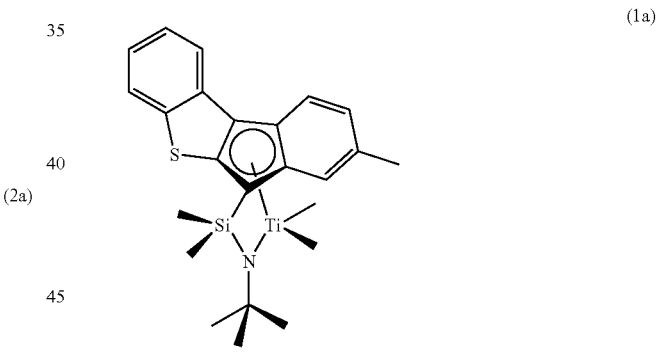

The ligand compound (2a) (1.68 g, 4.6 mmol) prepared in step 1 and 15 mL of methyl(tert-butyl)ether (MTBE) were added to a 100 mL Schlenk flask, and the mixture was first stirred. BuLi (9.43 mL, 2.05 eq., concentration in hexane: 2.5 M) was added thereto at –30° C. and reacted overnight at room temperature (20±5° C.). Then, methylmagnesium bromide (MeMgBr, 3.8 mL, 2.5 eq., concentration in diethyl ether: 3.0 M) was slowly added dropwise at –30° C., and TiCl$_4$ (4.6 mL, 1.0 eq., concentration in toluene: 1.0 M) was sequentially added and reacted overnight at room temperature (20±5° C.). Then, the reaction mixture was filtered through Celite using hexane. The solvent was dried to obtain a transition metal compound (1a) as a brown solid having the above chemical structure.

$^1$H NMR (500 MHz, C$_6$D$_6$, 7.15 ppm): δ 0.053 (s, 3H), 0.167 (s, 3H), 0.683 (s, 3H), 0.721 (s, 3H), 1.428 (S, 9H), 2.166 (s, 3H, aromatic-Me), 7.123-7.013 (m, 3H, aromatic), 7.248 (t, 1H), 7.457 (s, 1H, aromatic), 7.876-7.859 (d, 1H), 7.939-7.923 (d, 1H, aromatic).

Preparation Example 2

Step 1) Preparation of Ligand Compound (2b)

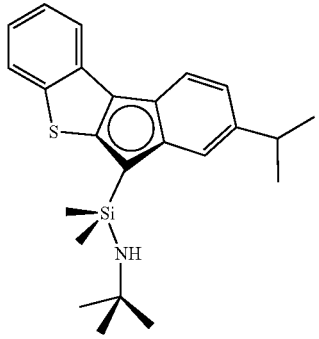

(2b)

A ligand compound (2b) having the above structure was prepared in the same manner as in step 1 of Preparation Example 1, except that 4-isopropylphenylmagnesium bromide (1.2 eq.) was used instead of p-tolylmagnesium bromide.

$^1$H NMR (500 MHz, C$_6$D$_6$, 7.15 ppm): δ-0.236 (s, 3H), 0.151 (s, 3H), 1.105 (s, 9H), 1.241-1.255 (d, 3H), 1.331-1.349 (s, 3H), 2.941-2.996 (m, 1H), 3.822 (s, 1H), 7.099-7.136 (m, 1H), 7.254-7.269 (d, 1H), 7.293-7.322 (t, 1H), 7.533 (s, 1H), 7.691-7.720 (t, 1H), 7.877-7.893 (d, 1H), 8.151-8.167 (d, 1H).

Step 2) Preparation of Transition Metal Compound (1b)

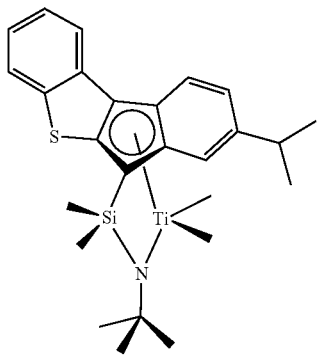

(1b)

A transition metal compound (1b) was prepared in the same manner as in step 2 of Preparation Example 1, except that a ligand compound (2b) (738 mg, 1.87 mmol) prepared in step 1 was used.

$^1$H NMR (500 MHz, C$_6$D$_6$, 7.15 ppm): δ 0.023 (s, 3H), 0.174 (s, 3H), 0.706 (s, 3H), 0.731 (s, 3H), 1.196-1.183 (d, 6H), 1.427 (S, 9H), 2.777-2.749 (m, 1H), 7.047-7.031 (t, 1H, aromatic), 7.256-7.205 (m, 3H), 7.538 (s, 1H, aromatic), 7.924-7.907 (d, 1H), 7.971-7.955 (d, 1H, aromatic).

Preparation Example 3

Step 1) Preparation of Ligand Compound (2c)

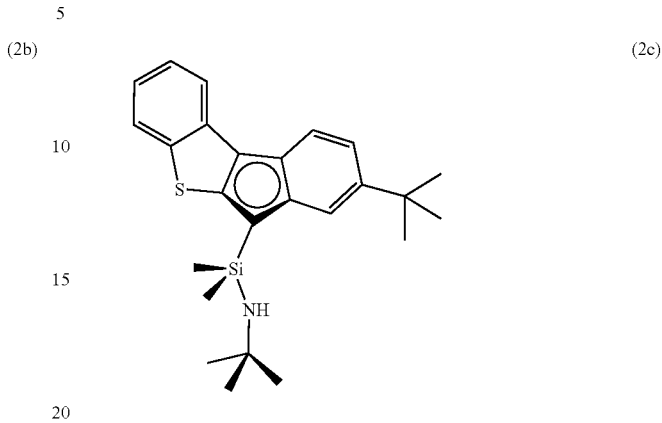

(2c)

A ligand compound (2c) was prepared in the same manner as in step 1 of Preparation Example 1, except that 4-t-butylphenylmagnesium bromide (1.2 eq.) was used instead of p-tolyl magnesium bromide.

$^1$H NMR (500 MHz, CDCl$_3$, 7.26 ppm): δ-0.245 (s, 3H), 0.150 (s, 3H), 1.278 (s, 9H), 1.405 (s, 9H), 2.358 (s, 1H), 4.005 (s, 1H), 7.32 (t, 1H), 7.40 (d, 1H), 7.46 (t, 1H), 7.65 (s, 1H), 7.82 (d, 1H), 7.87 (d, 1H), 8.16 (d, 1H).

Step 2) Preparation of Transition Metal Compound (1c)

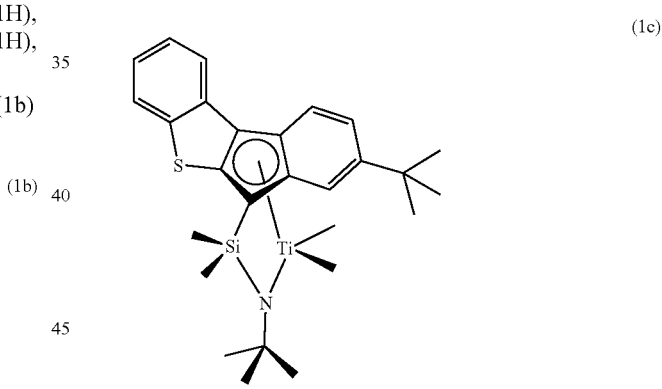

(1c)

The ligand compound (2c) (278.7 mg, 0.684 mmol) prepared in step 1 and 4 mL of MTBE were added to a 100 mL Schlenk flask, and the mixture was first stirred. BuLi (0.56 mL, 2.05 eq., concentration in hexane: 2.5 M) was added thereto at −78° C. and reacted overnight at room temperature (20±5° C.). Then, MeMgBr (0.57 mL, 2.5 eq., concentration in diethyl ether: 3.0 M) was slowly added dropwise at −78° C., and TiCl$_4$ (0.684 mL, 1 eq., concentration in toluene: 1.0 M) was sequentially added and reacted overnight at room temperature (20±5° C.). Then, the reaction mixture was filtered through Celite using hexane. The solvent was dried to obtain 260 mg of a transition metal compound (1c) as a brown solid having the above chemical structure (78.3%).

$^1$H NMR (500 MHz, C$_6$D$_6$, 7.15 ppm): δ−0.014 (s, 3H), 0.168 (s, 3H), 0.730 (d, 3H), 1.039 (s, 3H), 1.277 (s, 9H), 1.429 (s, 9H), 7.051 (m, 3H), 7.265 (t, 3H), 7.439 (t, 3H), 7.687 (s, 1H), 7.920 (d, 1H), 7.996 (d, 1H).

Comparative Preparation Example 1

A transition metal compound (1) was prepared in the same manner as in step 2 of Preparation Example 1, except that the ligand compound (i) (0.36 g, 0.993 mmol) having the following structure was used.

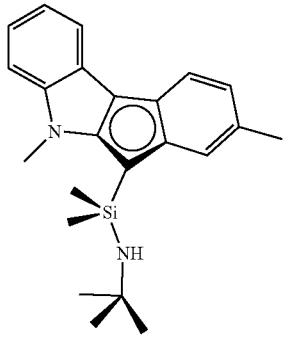
(i)

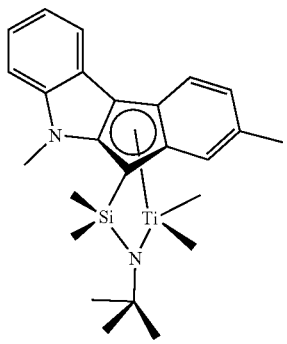
(I)

$^1$H NMR (500 MHz, C$_6$D$_6$, 7.15 ppm): δ-0.058 (s, 3H), 0.081 (s, 3H), 0.572 (s, 3H), 0.806 (s, 3H), 1.427 (s, 9H), 2.229 (s, 3H), 3.118 (s, 3H N-Me), 6.907-6.985 (d, 1H, aromatic), 7.288-7.257 (m, 2H), 7.641 (s, 1H, aromatic), 7.888-7.863 (d, 1H), 7.915-7.900 (d, 1H, aromatic).

Comparative Preparation Example 2

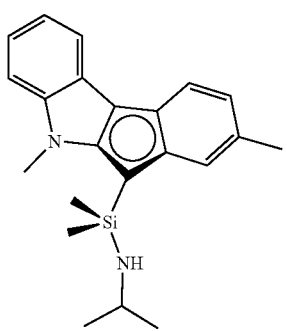
(ii)

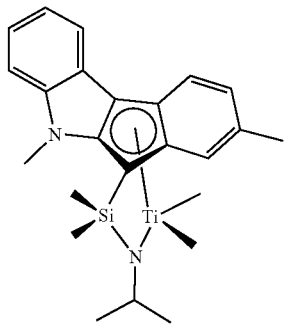
(II)

A transition metal compound (II) was prepared in the same manner as in step 2 of Preparation Example 1, except that the ligand compound (ii) (0.47 g, 1.349 mmol) having the above structure was used.

$^1$H NMR (500 MHz, C$_6$D$_6$, 7.15 ppm): δ-0.144 (s, 3H), 0.048 (s, 3H), 0.514 (s, 3H), 0.748 (s, 3H), 1.170-1.151 (dd, 6H), 2.221 (s, 3H), 3.104 (s, 3H N-Me), 4.800-4.775 (m, 1H), 7.012-6.997 (d, 1H, aromatic), 7.278-7.264 (m, 2H), 7.617 (s, 1H, aromatic), 7.936-7.930 (d, 1H), 7.919-7.913 (d, 1H, aromatic).

Comparative Preparation Example 3

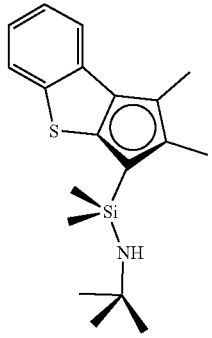
(iii)

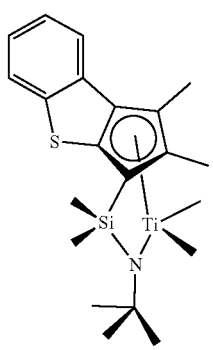
(III)

A transition metal compound having the above structure was synthesized with reference to Korean Patent No. 10-1637982.

In detail, a ligand compound (iii) (1.06 g, 3.22 mmol/1.0 eq.) having the above structure and 16.0 mL (0.2 M) of MTBE were added to a 50 mL Schlenk flask, and the mixture was first stirred. BuLi (2.64 mL, 6.60 mmol/2.05 eq., 2.5 M in THF) was added thereto at −40° C. and reacted overnight at room temperature. Then, MeMgBr (2.68 mL, 8.05 mmol/2.5 eq., 3.0 M in diethyl ether) was slowly added dropwise at −40° C., and then TiCl₄ (2.68 mL, 3.22 mmol/1.0 eq., 1.0 M in toluene) was sequentially added and reacted overnight at room temperature. Then, the reaction mixture was filtered through Celite using hexane. After drying the solvent, 1.07 g of brown solid was obtained in a yield of 82%.

¹H-NMR (in CDCl₃, 500 MHz): δ 7.99 (d, 1H), 7.68 (d, 1H), 7.40 (dd, 1H), 7.30 (dd, 1H), 3.22 (s, 1H), 2.67 (s, 3H), 2.05 (s, 3H), 1.54 (s, 9H), 0.58 (s, 3H), 0.57 (s, 3H), 0.40 (s, 3H), 0.45 (s, 3H).

Comparative Preparation Example 4

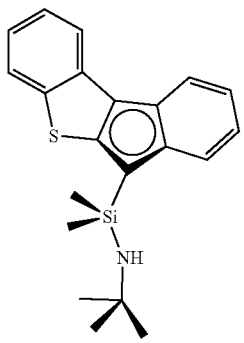

(iv)

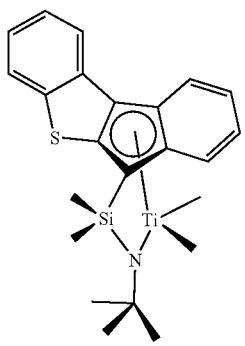

(IV)

A transition metal compound (IV) was prepared in the same manner as in step 2 of Preparation Example 1, except that the ligand compound (iv) (0.47 g, 1.349 mmol) having the above structure was used.

Compound (iv) ¹H NMR (500 MHz, C₆D₆, 7.15 ppm): δ −0.405 (s, 3H), 0.096 (s, 3H), 1.179 (s, 9H), 3.925 (s, 3H), 3.363 (s, 1H), 7.095-7.110 (m, 2H), 7.206-7.236 (t, 1H), 7.253-7.283 (t, 1H), 7.345-7.375 (t, 1H), 7.478-7.494 (d, 1H), 7.767-7.783 (d, 1H), 7.805-7.820 (d, 1H), 8.070-8.086 (d, 1H).

Compound (IV)¹H NMR (500 MHz, C₆D₆, 7.15 ppm): δ 0.014 (s, 3H), 0.152 (s, 3H), 0.614 (s, 9H), 0.700 (s, 3H), 1.413 (s, 9H), 6.977-7.008 (t, 1H), 7.028-7.061 (t, 1H), 7.195-7.259 (m, 3H), 7.422-7.437 (d, 1H), 7.569-7.586 (d, 1H), 7.897-7.936 (dd, 2H).

Comparative Preparation Example 5

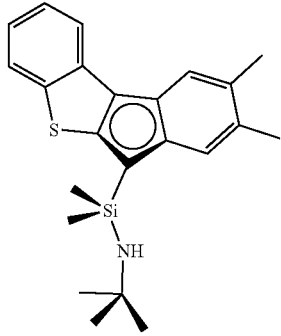

(v)

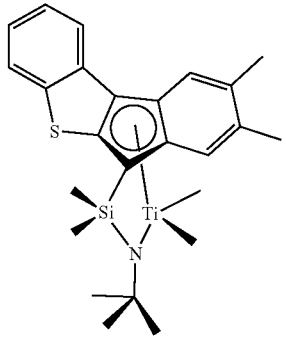

(V)

A transition metal compound (V) was prepared in the same manner as in step 2 of Preparation Example 1, except that the ligand compound (v) (0.47 g, 1.349 mmol) having the above structure was used.

Compound (V) ¹H NMR (500 MHz, C₆D₆, 7.15 ppm): δ 0.029 (s, 3H), 0.140 (s, 3H), 0.676 (s, 3H), 0.711 (s, 3H), 1.423 (S, 9H), 2.103 (s, 3H, aromatic-Me), 2.164 (s, 3H, aromatic-Me), 7.105-6.994 (m, 2H, aromatic), 7.265-7.23 (t, 1H), 7.433 (d, 1H, aromatic), 7.866-7.849 (d, 1H), 7.932-7.917 (d, 1H, aromatic).

Comparative Preparation Example 6

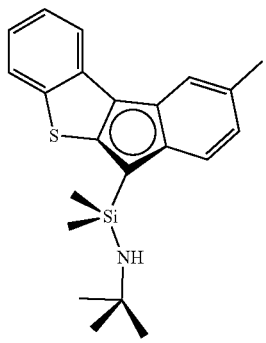

(vi)

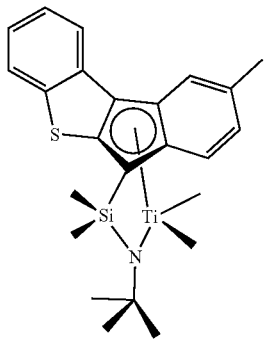

(VI)

A transition metal compound (VI) was prepared in the same manner as in step 2 of Preparation Example 1, except that the ligand compound (vi) (0.47 g, 1.349 mmol) having the above structure was used.

Compound (VI) $^1$H NMR (500 MHz, $C_6D_6$, 7.15 ppm): δ 0.029 (s, 3H), 0.140 (s, 3H), 0.676 (s, 3H), 0.711 (s, 3H), 1.423 (S, 9H), 2.103 (s, 3H, aromatic-Me), 7.105-6.994 (m, 3H, aromatic), 7.265-7.23 (t, 1H), 7.433 (d, 1H, aromatic), 7.8.

<Preparation of Olefin Copolymer>

Example 1: Preparation of ethylene/1-octene copolymer

A hexane (1.0 L, Daesan, purified) solvent and 240 ml of 1-octene (81%) were added to a 2 L autoclave reactor, and the reactor temperature was heated to 150° C. At the same time, the inside of the reactor was saturated with ethylene at about 35 bar. A catalyst-injection cylinder was filled with 3 μmol of the transition metal compound (1a) of Preparation Example 1 treated with 0.6 mmol of triisobutyl aluminum (TIBAL, 1.0 M), and 9 μmol (3 equivalents) of a dimethyl anilinium tetrakis(pentafluorophenyl)borate (AB) co-catalyst, and the result was injected into the reactor. Herein, the copolymerization reaction was carried out for 8 minutes while constantly injecting ethylene so as to maintain the pressure inside the reactor at about 35 bar.

After completion of the polymerization reaction, the remaining ethylene gas was withdrawn, and the polymer solution was added to an excess amount of ethanol to induce precipitation. The obtained polymer was washed two or three times each with ethanol and acetone, and dried in a vacuum oven at 80° C. for 12 hours or more.

Examples 2 and 3: Preparation of ethylene/1-octene copolymer

Copolymerization was carried out in the same manner as in Example 1, except that each of the transition metal compounds (1b and 1c) prepared in Preparation Examples 2 and 3 was used instead of the transition metal compound prepared in Preparation Example 1, and the content of 1-octene was changed as shown in Table 1 below.

Comparative Examples 1 to 6: Preparation of ethylene/1-octene copolymer

Copolymerization was carried out in the same manner as in Example 1 except that each of the transition metal compounds (I, II, III, IV, V, and VI) prepared in Comparative Preparation Examples 1 to 5 was used instead of the transition metal compound (1a) prepared in Preparation Example 1, and the content of 1-octene was changed as shown in Table 1 below.

Comparative Example 7: Preparation of ethylene/1-octene copolymer

Copolymerization was carried out in the same manner as in Example 1, except that the transition metal compound having the following structure was used instead of the transition metal compound prepared in Preparation Example 1, and the content of 1-octene was changed to 160 mL. At this time, the following transition metal compound (X) was prepared in accordance with the method described in [2007 Organometallics 26, 6686-6687].

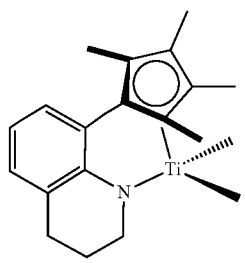

(X)

$^1$H NMR (CD6): δ 7.00 (d, J=7.2 Hz, 1H, Ph-H), 6.92 (d, J=7.2 Hz, 1H, Ph-H), 6.84 (t, J=7.6 Hz, 1H, Ph-H), 4.58-4.50 (m, 2H, $NCH_2$), 2.47 (t, J=6.4 Hz, 2H, $CH_2$), 2.05 (s, 6H, Cp-$CH_3$), 1.74-1.58 (m, 2H, $CH_2$), 1.66 (s, 6H, Cp-$CH_3$), 0.58 (s, 6H, Ti$CH_3$) ppm.

<Evaluation of Physical Properties of Olefin Copolymer>

Test Example 1: Physical Property Evaluation

Yield and catalytic activity in the preparation of the ethylene/1-octene copolymers according to examples and comparative examples, and a melt index (MI), a density, a crystallization temperature ($T_c$), and a melting temperature ($T_m$) of the prepared copolymers were each measured using methods as follows, and the results are shown in Table 1 below.

(1) Yield (g): The obtained polymer was vacuum-dried and the yield was measured.

(2) Catalytic activity: determined from a molar ratio of the transition metal compound based on the total amount of the obtained copolymer prepared. In detail, a ratio of the value obtained from measuring a mass of some of the reaction solution taken after the completion of the polymerization reaction, and the value obtained from measuring a mass of the copolymer remaining after removing all the hexane solvent and residual monomers by heating some of the copolymer for 10 minutes at 120° C. was calculated, and, based thereon, catalytic activity was calculated using the mass of the copolymer produced, the molar number of the transition metal compound used in the polymerization reaction, and the polymerization time.

(3) Melt index (MI): measured in accordance with ASTM D-1238 (condition E, 190° C., load of 2.16 kg).

(4) Density: the sample treated with an antioxidant (1000 ppm) was prepared to a sheet having a thickness of 3 mm and a radius of 2 cm using a 180° C. press mold, cooled by 10° C./min, and measured in a Mettler balance.

(5) Crystallization temperature ($T_c$) and melting temperature ($T_m$): measured using a differential scanning calorimeter (DSC) 2920 manufactured by TA Instruments. In detail, using DSC, the temperature of the copolymer was raised to 200° C. under a nitrogen atmosphere, maintained for 5 minutes, and then lowered to 30° C., and then raised again to observe a DSC curve. Herein, the heating rate and the cooling rate were each 10° C./min. In the measured DSC curve, the crystallization temperature was a maximum point of the exothermic peak in the cooling, and the melting temperature was a maximum point of the endothermic peak in the second temperature raising.

having a relatively high density was merely prepared. In addition, it can be confirmed that in the case of Comparative Example 1, the yield was less than half of that of Example 1, and the catalytic activity was also remarkably lowered. Further, even in the case of Comparative Example 3, 310 mL of 1-octene was used to prepare a polymer having a density of 0.871 g/cc. Accordingly, it can be seen that, in the case of Examples 1 to 3 according to the present invention, a low density polymer having a lower density could be prepared even by using a small amount of comonomer. In addition, the catalyst activity of Examples 1 to 3 was found to be superior at over 4.6 kg·PE/mmol·cat, whereas in the case of

TABLE 1

| | Type of transition metal compound | Content of transition metal compound (μmol) | Amount of 1-octene added (mL) | Yield (g) | atalytic activity (kgPE/ mmol) | Density (g/cc) | MI (g/10 min) | Tc (° C.) | Tm (° C.) |
|---|---|---|---|---|---|---|---|---|---|
| Example 1 | 1a | 3 | 240 | 18.3 | 6.1 | 0.872 | 0.9 | 40.9/72.2 | 60.3/(115.0) |
| Example 2 | 1b | 3 | 140 | 13.7 | 4.6 | 0.886 | 0.05 | 62.3/(78.0) | 77.7/(110.6) |
| Example 3 | 1c | 3 | 240 | 17.2 | 5.7 | 0.876 | 0.3 | 58.3/(73.0) | 72.5/(111) |
| Comparative Example 1 | I | 3 | 330 | 8.6 | 2.9 | 0.876 | 0.6 | 50.0/58.4 | 65.8 |
| Comparative Example 2 | II | 3 | 190 | 1.9 | 0.6 | 0.889 | Not measurable | 28.0/(64.7)/ 102.9 | 117.8 |
| Comparative Example 3 | III | 3 | 310 | 30 | 10 | 0.871 | 2.7 | 43.5/70.3 | 59.9/(66.8) |
| Comparative Example 4 | IV | 3 | 240 | 14.2 | 4.7 | 0.871 | 1.1 | 39.3/71.4 | 59.0/(112.8) |
| Comparative Example 5 | V | 3 | 240 | 9 | 3.0 | 0.889 | Not measurable | 30 | 118 |
| Comparative Example 6 | VI | 3 | 240 | 10 | 3.3 | 0.887 | Not measurable | 28 | 117 |
| Comparative Example 7 | X | 3 | 160 | 45.1 | 15.0 | 0.873 | 3.3 | 45.6 | 61.4 |

<Polymerization condition>
Ethylene (C2): 35 bar,
Octene (C8): 81%,
Hexane: Daesan (prepared by purification),
Temperature.: 150° C. (8 min),
Catalyst: 3 μmol,
Cocatayst: dimethyl anilinium tetrakis(pentafluorophenyl)borate (AB) 9 μmol (3 eq.),
Scavenger: triisobutyl aluminum (TIBAL, 0.6 mmol)

As shown in Table 1, the ethylene-octene copolymers of Examples 1 to 3 prepared using the catalyst composition containing the transition metal compound according to the present invention exhibited lower density, MI, $T_c$, and $T_m$ even when a lower amount of comonomer was added, compared with the copolymers of Comparative Examples 1 to 7. In particular, the copolymers of Examples 1 to 3 exhibited a low MI of less than 1 g/10 min together with a low density of 0.89 g/cc or less. Consequently, the transition metal compounds of Examples 1 to 3 according to the present invention had a substituted indeno-fused benzothiophene ligand structure, and could control electronic and steric environments around the metal, thereby exhibiting superior catalytic activity and copolymerizability. As a result, low density and high molecular weight olefin polymers were prepared.

In particular, in the case of Examples 1 to 3, a polymer having a low density could be prepared with a small amount of comonomer as compared with Comparative Examples 1 to 3. More specifically, in the case of Example 1, 240 mL of octene was required in the preparation of a polymer having a density of 0.872 g/cc, but in the case of Comparative Example 1, even when 330 ml of octene was used, a polymer having a density of 0.876 g/cc was prepared, that is, even when a higher amount of 1-octene was used, a polymer Comparative Example 1, the catalyst activity was found to be only 2.9 kg·PE/mmol·cat. Thus, in Comparative Example 1, although a considerable amount of comonomer (octene) was added, it was difficult to use it as a catalyst for producing elastomer products because the density was low and the catalyst activity was remarkably low. Further, in general, it was difficult to produce a polymer having a higher molecular weight as the polymer had a lower density, but in the case of Examples 1 to 3, a high molecular weight polymer having an MI of 0.9 g/10 min or less while having a low density could be produced. As a result, a polymer having excellent impact strength and elongation could be secured.

Furthermore, in the case of Comparative Example 3 prepared using the catalyst composition containing a transition metal compound (III) having a ligand structure fused with cyclopentadiene and benzothiophene, the copolymerization property with 1-octene was remarkably low, and thus a copolymer having the same level of density as that of Examples 1 to 3 was produced when 310 mL of 1-octene had to be excessively added during polymerization. However, the prepared copolymer was a low molecular weight copolymer having a high MI of 2.7.

Further, in the case of Comparative Example 4 prepared using the catalyst composition including the transition metal compound (IV) having an unsubstituted indeno-fused benzothiophene ligand structure, the yield was lowered due to the low catalytic activity as compared with Example 1, and the prepared copolymer exhibited the same level of density as that of Example 1, but it was a lower molecular weight copolymer having a higher MI. In the case of Comparative Examples 5 and 6, a transition metal compound having a structure similar to that of Example 1 was applied, but the yield was reduced due to low catalytic activity, and a low molecular weight copolymer was prepared in which MI was too high to measure at all. As seen in Comparative Example 6, it exhibited the same level of density as that of Example 1, but a low molecular weight copolymer having a high MI of 3.3 was prepared. It can be seen that, in Comparative Examples 5 and 6, the catalyst activity was remarkably low, the molecular weight was low, and the copolymerization property was remarkably lowered.

As described above, in the transition metal compounds according to the present invention, a transition metal as a central metal may form the specific rigid pentagonal ring structure with an amino group substituted with a silyl group. Therefore, the transition metal compound is capable of exhibiting excellent structural stability together with excellent polymerization reactivity by maintaining a pentagonal ring structure. Since approaches of monomers having large steric hindrance such as 1-ocatene are more facilitated structurally, the transition metal compound is particularly useful for the preparation of polyolefin with large alpha-olefin as well as high molecular weight and low density polyolefin.

The invention claimed is:
1. A transition metal compound represented by the following Chemical Formula 1:

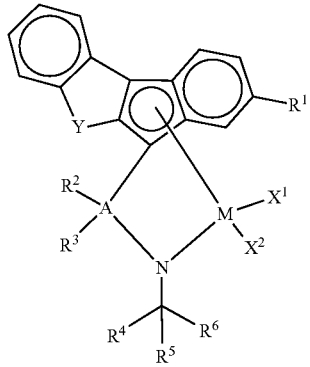

[Chemical Formula 1]

wherein, in Chemical Formula 1,
A is carbon, silicon, or germanium;
Y is oxygen or sulfur;
M is a Group 4 transition metal;
$X^1$ and $X^2$ are the same as or different from each other, and are each independently a halogen, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;

$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group;

$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring; and $R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl.

2. The transition metal compound according to claim 1, wherein $R^1$ is an alkyl group having 1 to 8 carbon atoms, an alkoxy group having 1 to 8 carbon atoms, or an aryl group having 6 to 12 carbon atoms.

3. The transition metal compound according to claim 1, wherein $R^1$ is a methyl group, an ethyl group, a propyl group, an isopropyl group, an n-butyl group, a tert-butyl group, a pentyl group, a hexyl group, a heptyl group, an octyl group, a phenyl group, a methoxy group, or an ethoxy group.

4. The transition metal compound according to claim 1, wherein $R^2$ and $R^3$ are each independently hydrogen, an alkyl group having 1 to 8 carbon atoms, an alkoxyalkyl group having 2 to 8 carbon atoms, or an aryl group having 6 to 12 carbon atoms.

5. The transition metal compound according to claim 1, wherein $R^2$ and $R^3$ are each independently hydrogen, a methyl group, an ethyl group, a propyl group, an isopropyl group, an n-butyl group, a tert-butyl group, a methoxymethyl group, a tert-butoxymethyl group, a tert-butoxyhexyl group, a 1-ethoxyethyl group, a 1-methyl-1-methoxyethyl group, or a phenyl group.

6. The transition metal compound according to claim 1, wherein $R^4$ to $R^6$ are each independently hydrogen, an alkyl group having 1 to 8 carbon atoms, or an aryl group having 6 to 12 carbon atoms.

7. The transition metal compound according to claim 1, wherein $R^4$ to $R^6$ are each independently hydrogen, a methyl group, an ethyl group, a propyl group, or a phenyl group.

8. The transition metal compound according to claim 1, wherein the compound represented by Chemical Formula 1 is represented by one of the following structural formulae:

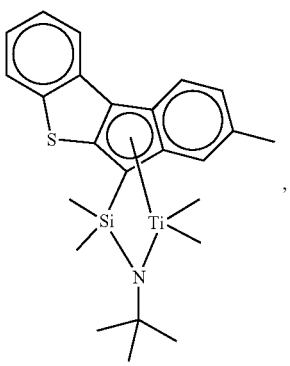

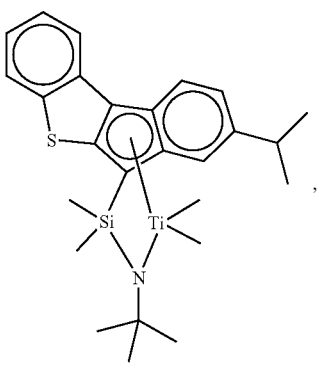

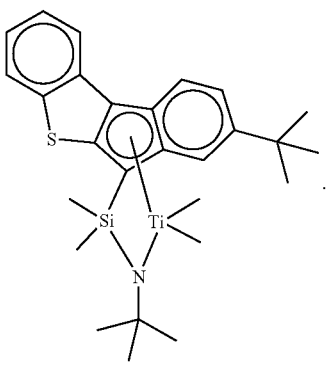

9. A method for preparing a transition metal compound represented by the following Chemical Formula 1, comprising:

reacting a ligand compound represented by the following Chemical Formula 2 with an organolithium-based compound to form a reaction product; and then reacting the reaction product with a compound represented by the following Chemical Formula 3, and a Grignard compound or an organolithium-based compound to form a transition metal compound:

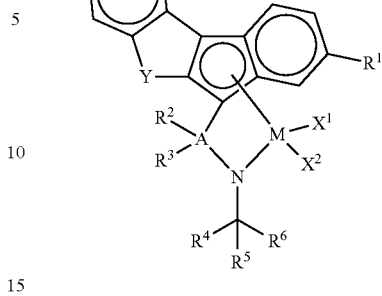

[Chemical Formula 1]

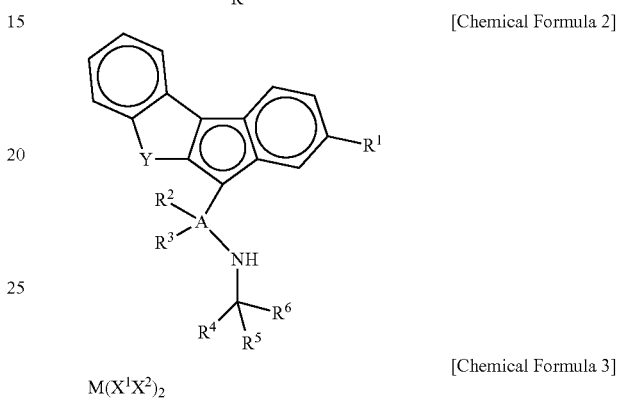

[Chemical Formula 2]

$M(X^1X^2)_2$ [Chemical Formula 3]

wherein, in Chemical Formulae 1, 2, and 3,

A is carbon, silicon or germanium;

Y is oxygen or sulfur;

M is a Group 4 transition metal;

$X^1$ and $X^2$ are the same as or different from each other, and are each independently a halogen, a substituted or unsubstituted C1 to C20 alkyl group, a substituted or unsubstituted C2 to C20 alkenyl group, a substituted or unsubstituted C6 to C20 aryl group, a nitro group, an amido group, a substituted or unsubstituted C1 to C20 alkylamino group, a substituted or unsubstituted C6 to C20 arylamino group, a substituted or unsubstituted C1 to C20 alkylsilyl group, a substituted or unsubstituted C1 to C20 alkoxy group, or a substituted or unsubstituted C1 to C20 sulfonate group;

$R^1$ is a substituted or unsubstituted C1 to C20 alkyl group, a substituted or unsubstituted C1 to C20 alkoxy group, a substituted or unsubstituted C2 to C20 alkenyl group, a substituted or unsubstituted C6 to C20 aryl group, a substituted or unsubstituted C7 to C20 alkylaryl group, or a substituted or unsubstituted C7 to C20 arylalkyl group;

$R^2$ and $R^3$ are the same as or different from each other, and are each independently hydrogen, a halogen, a substituted or unsubstituted C1 to C20 alkyl group, a substituted or unsubstituted C2 to C20 alkenyl group, a substituted or unsubstituted C2 to C20 alkoxyalkyl group, a substituted or unsubstituted C6 to C20 aryl group, a substituted or unsubstituted C7 to C20 alkylaryl group, or a substituted or unsubstituted C7 to C20 arylalkyl group, or $R^2$ and $R^3$ are linked to each other to form a substituted or unsubstituted aliphatic or aromatic ring; and $R^4$ to $R^6$ are the same as or different from each other, and are each independently hydrogen, a substituted or unsubstituted C1 to C20 alkyl, a substituted or unsubstituted C2 to C20 alkenyl, a substituted or unsubstituted C6 to C20 aryl group, a substituted or unsubstituted C7 to C20 alkylaryl, or a substituted or unsubstituted C7 to C20 arylalkyl.

10. The method for preparing a transition metal compound according to claim 9, further comprising:
reacting a compound of the following Chemical Formula 4 with a compound of the following Chemical Formula 5 to prepare the ligand compound of Chemical Formula 2:

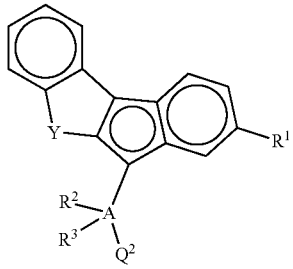

[Chemical Formula 4]

H$_2$N(CR$^4$R$^5$R$^6$) [Chemical Formula 5]

wherein, in Chemical Formulae 4 and 5,
A, Y, and R$^1$ to R$^6$ are as defined for Chemical Formulae 1 and 2, and
Q$^2$ is a halogen group.

11. The method for preparing a transition metal compound according to claim 10, further comprising:
reacting a compound of the following Chemical Formula 6 with a compound of the following Chemical Formula 7 in the presence of an organolithium-based compound to prepare the compound of Chemical Formula 4:

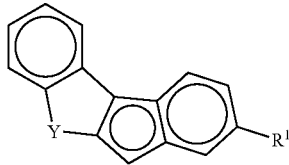

[Chemical Formula 6]

[Chemical Formula 7]

wherein, in Chemical Formulae 6 and 7,
A, Y, R$^1$ to R$^3$, and Q$^2$ are as described in Chemical Formulae 4 and 5, and
Q$^1$ is a halogen group.

12. The method for preparing a transition metal compound according to claim 9, wherein the organolithium-based compound is selected from the group consisting of alkyl lithium, cycloalkyl lithium, allyl lithium, vinyl lithium, aryl lithium, arylalkyl lithium, and alkylaryl lithium.

13. The method for preparing a transition metal compound according to claim 9, wherein the ligand compound represented by Chemical Formula 2 and the organolithium-based compound are used in a molar ratio of 1:1 to 1:3.

14. The method for preparing a transition metal compound according to claim 9, wherein the reaction of the ligand compound represented by Chemical Formula 2 and the organolithium-based compound is carried out at −90° C. to 10° C.

15. The method for preparing a transition metal compound according to claim 9, wherein the Grignard compound includes a compound represented by the following Chemical Formula 13:

R'MgX [Chemical Formula 13]

wherein, in Chemical Formula 13,
R' is selected from the group consisting of a C1 to C20 alkyl group, a C3 to C20 cycloalkyl group, a C6 to C20 aryl group, a C7 to C20 alkylaryl group, and a C7 to C20 arylalkyl group, and
X is a halogen group.

16. A catalyst composition comprising a transition metal compound according to claim 1.

17. The catalyst composition according to claim 16, further comprising:
one or more selected from the group consisting of compounds of the following Chemical Formulae 14 to 16:

A(R$^7$)$_3$ [Chemical Formula 14]

[L-H]$^+$[W(D)$_4$]$^-$ [Chemical Formula 15]

[L]$^+$[W(D)$_4$]$^-$ [Chemical Formula 16]

wherein, in Chemical Formulae 14 to 16,
each of R$^7$ is independently selected from the group consisting of a halogen group, a hydrocarbyl group having 1 to 20 carbon atoms, and a hydrocarbyl group having 1 to 20 carbon atoms substituted with a halogen group;
A is boron,
each D is independently an aryl group having 6 to 20 carbon atoms or an alkyl group having 1 to 20 carbon atoms in which one or more hydrogen atoms may be substituted with a substituent, and herein, the substituent is at least any one selected from the group consisting of a halogen, a hydrocarbyl group having 1 to 20 carbon atoms, an alkoxy group having 1 to 20 carbon atoms, and an aryloxy group having 6 to 20 carbon atoms;
[L-H]$^+$ is a Brønsted acid, wherein H is a hydrogen atom;
[L]$^+$ is a cationic Lewis acid; and
W is a group 13 element.

* * * * *